United States Patent
Turney et al.

(10) Patent No.: US 9,728,767 B2
(45) Date of Patent: Aug. 8, 2017

(54) MAGNETIC DEVICE FOR PRODUCING ELECTROLYTE FLOW IN BATTERY SYSTEMS

(71) Applicant: Research Foundation of the City University of New York, New York, NY (US)

(72) Inventors: Damon E. Turney, Brooklyn, NY (US); Kevin Galloway, New York, NY (US)

(73) Assignee: Research Foundation of the City University of New York, New York, NY (US)

( * ) Notice: Subject to any disclaimer, the term of this patent is extended or adjusted under 35 U.S.C. 154(b) by 171 days.

(21) Appl. No.: 14/442,246

(22) PCT Filed: Nov. 13, 2013

(86) PCT No.: PCT/US2013/069889
§ 371 (c)(1),
(2) Date: May 12, 2015

(87) PCT Pub. No.: WO2014/078411
PCT Pub. Date: May 22, 2014

(65) Prior Publication Data
US 2016/0276649 A1  Sep. 22, 2016

Related U.S. Application Data

(60) Provisional application No. 61/725,976, filed on Nov. 13, 2012.

(51) Int. Cl.
*H01M 8/18* (2006.01)
*H01M 2/38* (2006.01)
(Continued)

(52) U.S. Cl.
CPC ............ *H01M 2/38* (2013.01); *F04D 13/027* (2013.01); *F04D 29/4293* (2013.01);
(Continued)

(58) Field of Classification Search
CPC ....................................................... H01M 8/18
(Continued)

(56) References Cited

U.S. PATENT DOCUMENTS

| 3,257,241 A | 6/1966 | Tamminen |
| 4,329,406 A | 5/1982 | Dahl et al. |

(Continued)

FOREIGN PATENT DOCUMENTS

| JP | 5875764 A | 5/1983 |
| JP | S59198658 A | 11/1984 |

(Continued)

OTHER PUBLICATIONS

Foreign Communication from a related counterpart application—Extended European Search Report of EP Application No. 13855317.7, dated Oct. 11, 2016, 14 pages.

(Continued)

*Primary Examiner* — Thuan Do
(74) *Attorney, Agent, or Firm* — Conley Rose, P.C.; Andrew M. Metrailer

(57) ABSTRACT

A device for producing electrolyte flow in a flow-assisted battery comprises a flow assisted battery, a powering device located on a dry side of a battery housing, and an impeller assembly located on a wet side of the battery housing. The flow assisted battery comprises a battery housing, an anode, a cathode and an electrolyte solution, where the anode, the cathode and the electrolyte solution are disposed within the battery housing. The impeller assembly comprises: a shaft, an impeller, and one or more interior magnets, and the (Continued)

powering device and the impeller assembly are magnetically coupled through the battery housing.

29 Claims, 17 Drawing Sheets

(51) Int. Cl.

| | | |
|---|---|---|
| *H01M 10/30* | (2006.01) | |
| *H01M 6/04* | (2006.01) | |
| *F04D 29/42* | (2006.01) | |
| *F04D 13/02* | (2006.01) | |
| *H01M 4/42* | (2006.01) | |
| *H01M 4/50* | (2010.01) | |
| *H01M 4/52* | (2010.01) | |
| *H01M 10/24* | (2006.01) | |
| *H01M 10/46* | (2006.01) | |
| *H02J 7/00* | (2006.01) | |
| *H01M 4/02* | (2006.01) | |

(52) U.S. Cl.
CPC ............... *H01M 4/42* (2013.01); *H01M 4/50* (2013.01); *H01M 4/52* (2013.01); *H01M 6/04* (2013.01); *H01M 8/18* (2013.01); *H01M 10/24* (2013.01); *H01M 10/30* (2013.01); *H01M 10/46* (2013.01); *H02J 7/007* (2013.01); *H02J 7/0042* (2013.01); *H01M 2004/027* (2013.01); *H01M 2004/028* (2013.01); *H01M 2220/10* (2013.01); *Y02E 60/528* (2013.01)

(58) Field of Classification Search
USPC .......................................................... 320/107
See application file for complete search history.

(56) References Cited

U.S. PATENT DOCUMENTS

| | | |
|---|---|---|
| 4,565,748 A | 1/1986 | Dahl |
| 2004/0067410 A1 | 4/2004 | Jones |
| 2013/0113431 A1* | 5/2013 | Banerjee ................. H01M 2/40 320/134 |

FOREIGN PATENT DOCUMENTS

| | | |
|---|---|---|
| JP | 11185730 A | 7/1999 |
| JP | 2011111953 A | 6/2011 |
| WO | 2011047105 A1 | 4/2011 |
| WO | 2014078411 A1 | 5/2014 |

OTHER PUBLICATIONS

Foreign Communication from a related counterpart application—Partial Supplementary European Search Report of EP Application No. 13855317.7, dated Jun. 14, 2016, 8 pages.

Certified copy of provisional application entitled "A Magnetic Device for Producing Electrolyte Flow in Battery Systems," by Damon Tourney, filed Nov. 13, 2012 as U.S. Appl. No. 61/725,976.

Foreign communication from the priority application—International Search Report and Written Opinion, PCT/US2013/069889, 12 pages.

Foreign communication from the priority application—International Preliminary Report on Patentability, PCT/US2013/069889, 10 pages.

\* cited by examiner

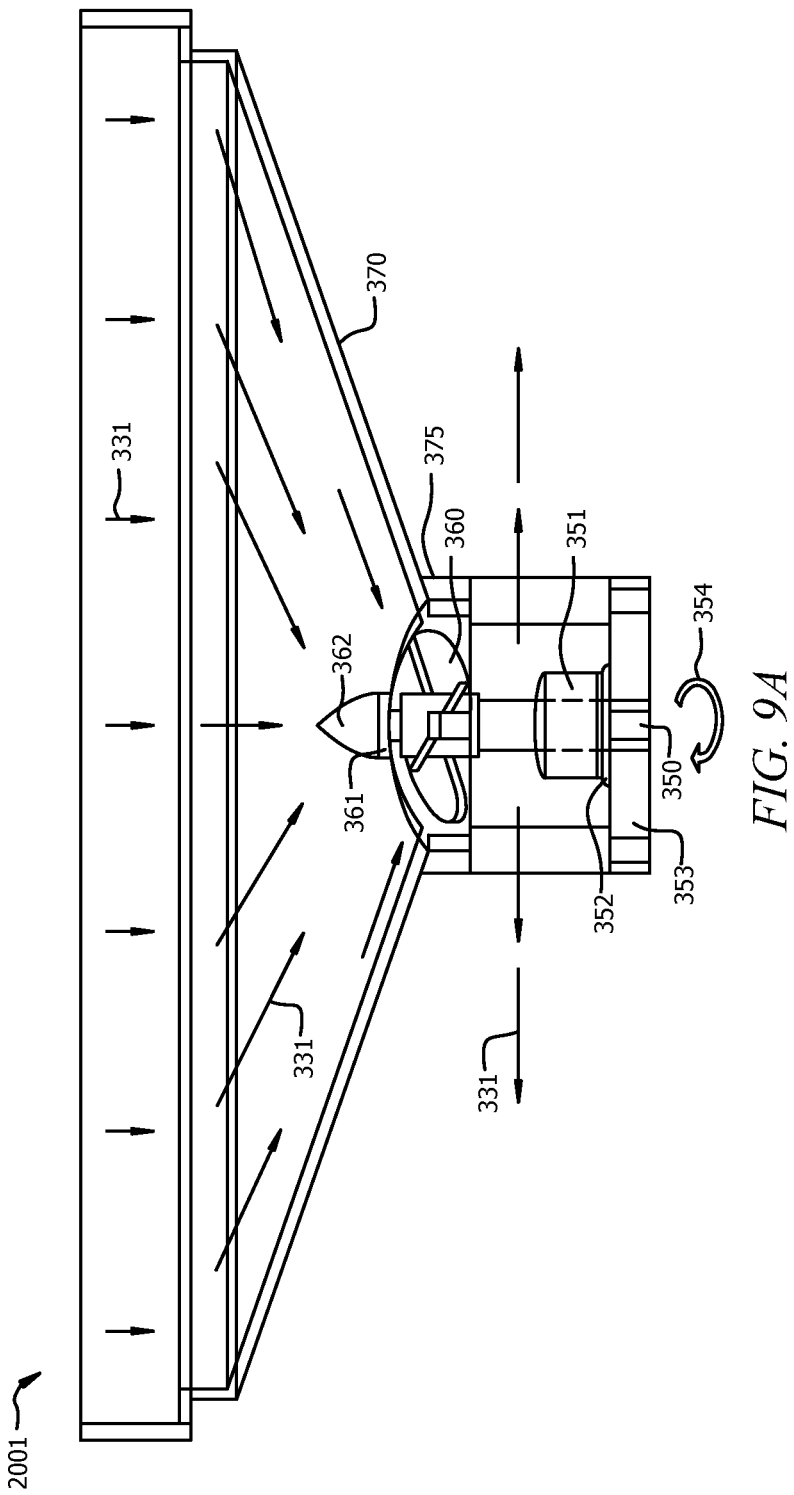

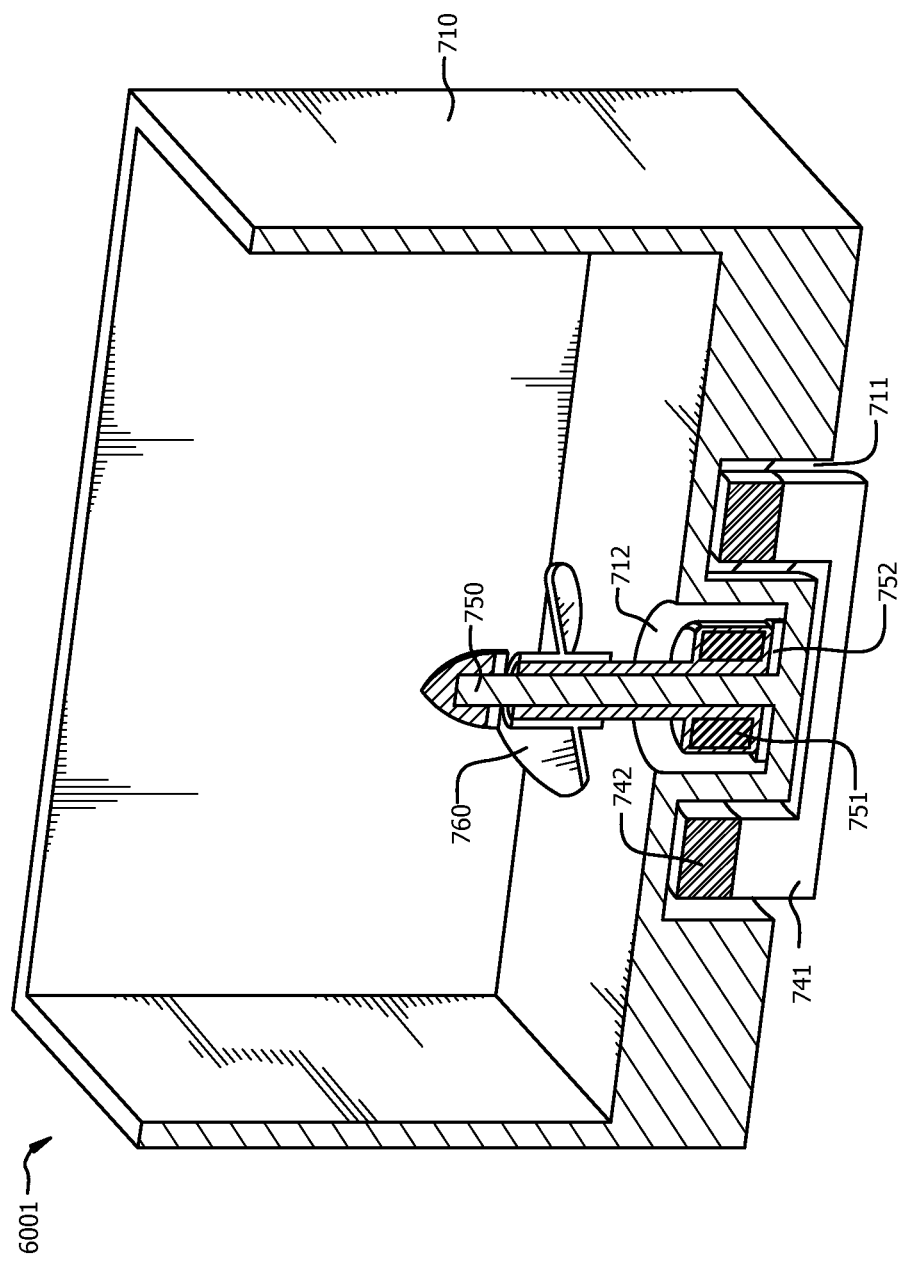

MAGNETIC DEVICE FOR PRODUCING ELECTROLYTE FLOW IN BATTERY SYSTEMS

CROSS-REFERENCE TO RELATED APPLICATIONS

This application is a filing under 35 U.S.C. 371 of International Application No. PCT/US2013/069889 filed Nov. 13, 2013, entitled "A Magnetic Device for Producing Electrolyte Flow in Battery Systems," which claims the benefit of U.S. Provisional Application No. 61/725,976 filed on Nov. 13, 2012 which is incorporated herein by reference in its entirety for all purposes.

STATEMENT REGARDING GOVERNMENTALLY SPONSORED RESEARCH OR DEVELOPMENT

The invention described and claimed herein was made in part utilizing funds supplied by the New York State Energy Research and Development Authority (NYSERDA) under contract No. 18786. The Government may have certain rights in this invention.

REFERENCE TO A MICROFICHE APPENDIX

Not applicable.

BACKGROUND

This disclosure relates to methods of assembling and/or manufacturing flow-assisted batteries. More specifically, it relates to methods for assembling and/or manufacturing magnetic devices for producing electrolyte flow in flow-assisted batteries.

As the world population increases and the available resources are finite, energy production and storage is of paramount importance to the modern contemporary society. An important class of energy storage systems is represented by rechargeable batteries, also known as secondary batteries, secondary electrochemical cells or secondary cells. Secondary batteries represent an excellent class of electrical energy storage technologies for matching energy consumption with production, especially for the integration of renewable sources; however the development of secondary batteries is limited in part by the available materials (e.g., electrodes, electrolyte, etc.) and strategies for assembling such batteries.

A special type of secondary batteries are flow-assisted batteries, wherein an electrolyte solution is circulated around the electrodes (e.g., anode, cathode), and the circulation of the electrolyte solution may provide a means for recharging the battery. Conventional battery designs of flow-assisted batteries generally have a pump located outside a battery tank holding the electrodes (e.g., anodes, cathodes), which battery tank is equipped with tubing and tube fittings for transporting an electrolyte solution between the battery tank and an outside auxiliary tank that contains electrolyte solution. Some drawbacks of these conventional battery designs of flow-assisted batteries include a high cost operation; safe containment of the electrolyte solution is at risk due to tubing and tube fittings; pumping energy costs are higher due to friction in the tubing, tube fittings, and inlet and outlet ports, and a complex design.

Primary batteries may also benefit from flowing or agitated electrolyte (e.g., flow-assisted primary batteries). A nonlimiting example of flow-assisted primary batteries includes flow batteries used in underwater torpedoes.

As such, there exists a need for improved designs and devices for producing electrolyte flow in flow-assisted batteries and methods of making same.

SUMMARY

In an embodiment, a device for producing electrolyte flow in a flow-assisted battery comprises a flow assisted battery, a powering device located on a dry side of a battery housing, and an impeller assembly located on a wet side of the battery housing. The flow assisted battery comprises a battery housing, an anode, a cathode and an electrolyte solution, where the anode, the cathode and the electrolyte solution are disposed within the battery housing. The impeller assembly comprises: a shaft, an impeller, and one or more interior magnets, and the powering device and the impeller assembly are magnetically coupled through the battery housing. The powering device may generate a rotating magnetic field. The powering device may comprise one or more exterior magnets, and the interior magnets and the exterior magnets may be magnetically coupled. The interior magnets and the exterior magnets may be radially aligned. The powering device may comprise one or more electromagnets, and the interior magnets and the electromagnets may be magnetically coupled. The impeller assembly may comprise a centrifugal impeller. The impeller may comprise a device for stirring a liquid, a propeller, a stirring element, a liquid stirrer, an elliptical stirrer, a stir bar, a magnetic stir bar, or any combination thereof. The blades may have a pitch of about 45 degrees. At least a portion of an outer surface of at least one of the impeller, the shaft, or the one or more interior magnets may be coated with a chemical resistant coating, a polymer, polytetrafluoroethylene, TEFLON, DELRIN, noryl resin, or any combination thereof. The powering device may comprise a magnetic drive, an electronic speed controller, a polyphase AC electrical power system, a two-phase AC electrical power system, a three-phase AC electrical power system, a motor, a brushless DC motor, an AC electric motor, or a DC electric motor. The powering device may be removably coupled to the battery housing. The impeller assembly may also include a mounting base, a lower thrust bearing, a sleeve bearing, an upper thrust bearing, and a threaded lock nut. The threaded lock nut and/or the upper thrust bearing may prevent the impeller from decoupling, and/or at least a portion of the shaft may be located inside at least a portion of the sleeve bearing. The sleeve bearing may comprise the interior magnets. The sleeve bearing may comprise a body comprising a chemical resistant coating, a polymer, polytetrafluoroethylene, TEFLON, DELRIN, noryl resin, or combinations thereof, and/or the interior magnet may comprise a ring magnet. The body of the sleeve bearing encases the ring magnet, thereby protecting the ring magnet from the electrolyte solution. At least a portion of an outer surface of the interior magnet may be coated with a chemical resistant coating, a polymer, polytetrafluoroethylene, TEFLON, DELRIN, noryl resin, or combinations thereof. The flow assisted battery may comprise a flow-assisted secondary nickel-zinc battery, the anode may comprise a Zn anode, and/or the cathode may comprise a nickel oxide cathode. The flow assisted battery may comprise a flow-assisted secondary Zn—MnO2 battery, the anode may comprise a Zn anode, and/or the cathode may comprise a MnO2 cathode. The flow-assisted battery may comprise an electrode stack, and the electrode stack may comprise flow channels. The flow-assisted battery further may comprise a bilge wall, and the bilge wall may house at least a portion of the impeller, thereby producing an even flow of electrolyte solution through the flow channels. The device may also include one or more spacers disposed between the anode and cathode, and the one or more spacers may be configured to maintain a fixed spacing between the anode and cathode. The one or more spacers may comprise a plurality of snap spacer. A first snap spacer of the plurality of snap spacers may couple to the anode, and/or a second snap spacer of the plurality of snap spacers may couple to the cathode. The first snap spacer may be configured to snap to the second snap spacer and maintain the fixed spacing. The powering device may be electrically powered by at least one of an external source, by a battery, or by a series of batteries. The battery or the series of batteries may comprise a flow-assisted battery.

In an embodiment, a device for producing electrolyte flow in a flow-assisted battery comprises a flow assisted battery, a funnel assembly in fluid communication with an electrode stack, an impeller assembly located on a wet side of a battery housing, and a powering device located on a dry side of the battery housing. The flow assisted batter comprises a battery housing, an electrode stack, and an electrolyte solution, and the electrode stack and the electrolyte solution are disposed within the battery housing. The funnel assembly is configured to direct fluid flow through the electrode stack. The impeller assembly comprises: an impeller, and one or more interior magnets, and the impeller is configured to generate a fluid flow through the funnel when the impeller is rotating. The powering device and the impeller assembly are magnetically coupled through the battery housing. The funnel may comprises a funnel neck, and at least a portion of the impeller may be located inside the funnel neck. The electrode stack may comprise flow channels, and the funnel may support the electrode stack within the battery housing. The funnel may be configured to create a substantially even flow of electrolyte solution through the flow channels. The electrode stack may comprise a plurality of anodes and a plurality of cathodes, and the device may further comprise a plurality of spaces disposed between adjacent anodes and cathodes of the plurality of anodes and the plurality of cathodes. The powering device may comprise one or more exterior magnets, and the one or more exterior magnets may be configured to magnetically couple through the housing to the one or more interior magnets. The one or more exterior magnets may be radially aligned with the one or more interior magnets.

In an embodiment, a method for producing energy comprises charging a flow-assisted battery to a charge voltage, discharging the flow-assisted battery to a discharge voltage to produce energy, and continuously circulating the electrolyte solution through the battery housing during the charging and the discharging by using a magnetic device for producing electrolyte flow in a flow-assisted battery. The flow-assisted battery comprises: a battery housing, a cathode, an anode, and an electrolyte solution, wherein the cathode, the anode, and the electrolyte solution are supported within the battery housing. The magnetic device for producing electrolyte flow in a flow-assisted battery may comprise a powering device located on a dry side of the battery housing, and an impeller assembly located on a wet side of the battery housing. The impeller assembly may comprise a shaft, an impeller, and one or more interior magnets, and the powering device and the impeller assembly may be magnetically coupled through the battery housing. Continuously circulating the electrolyte solution may comprise rotating a component of the power device, and the component may be magnetically coupled to the one or more interior magnets, rotating the interior magnets in response to rotating the component; rotating the shaft and impeller in response to rotating the interior magnets, and creating fluid flow based on the rotation of the impeller. The flow-assisted battery may comprise an electrode stack, and the electrode stack may comprise a plurality of flow channels. Continuously circulating the electrolyte solution may comprise substantially evenly circulating the electrolyte solution through the plurality of flow channels. The flow-assisted battery may comprise a flow-assisted secondary nickel-zinc battery, the anode may comprise a zinc anode, and/or the cathode may comprise a nickel oxide cathode. The flow-assisted battery may comprise a flow-assisted secondary zinc-manganese dioxide battery, the anode may comprise a zinc anode, and/or the cathode may comprise a manganese dioxide cathode.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 9A displays a schematic representation of an embodiment of an impeller assembly of an MDEF.

FIG. 13A displays a schematic of an embodiment of magnets for magnet coupling in a powering device of an MDEF.

DETAILED DESCRIPTION

Figure 1:
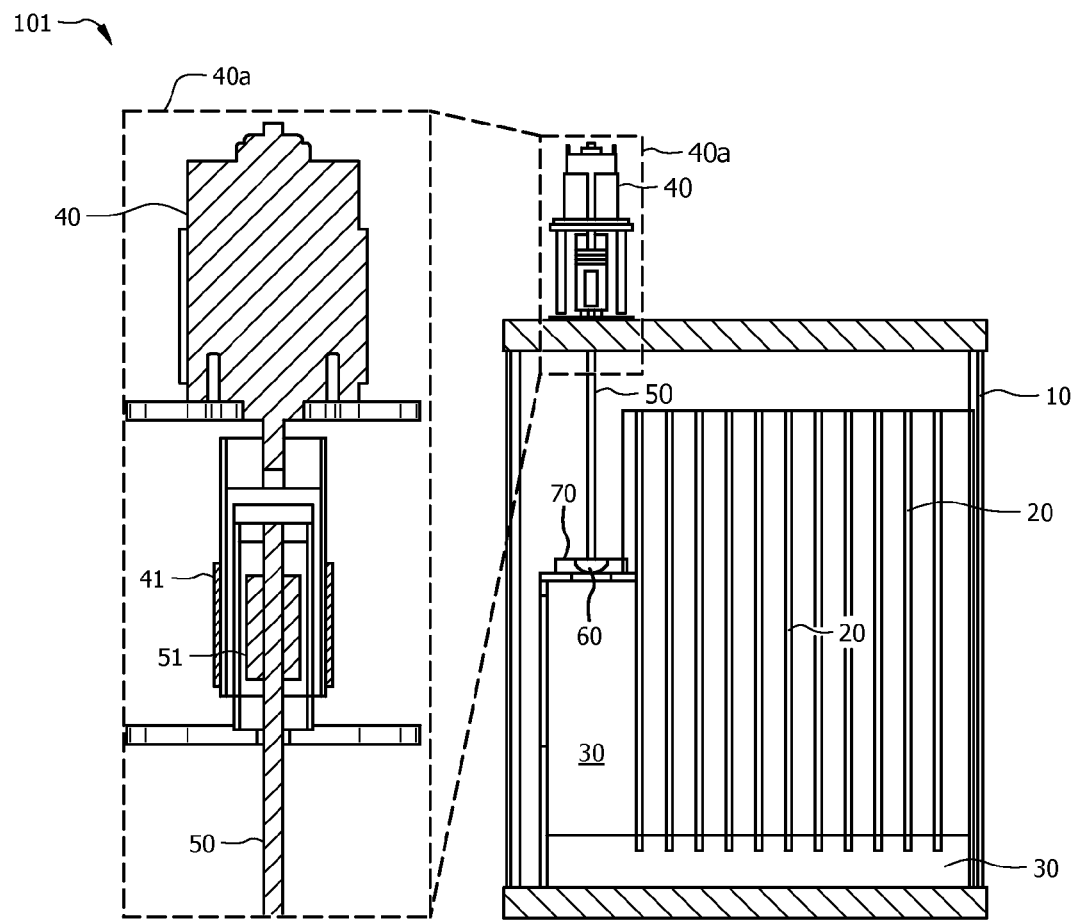
FIG. 1 displays a cross-section schematic of an embodiment of a magnetic device for producing electrolyte flow in flow-assisted batteries (MDEF) showing coupling via cylindrical or ring magnets.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are embodiments of magnetic devices for producing electrolyte flow in flow-assisted batteries (MDEFs) and methods of making and using same. In an embodiment, the flow-assisted battery using the MDEF comprises a primary battery. In some embodiments, the flow-assisted battery using the MDEF comprises a secondary battery (e.g., a nickel-zinc battery). While the present disclosure will be discussed in detail in the context of flow-assisted secondary nickel-zinc batteries, it should be understood that other flow-assisted batteries, such as for example flow-assisted secondary zinc-manganese dioxide batteries, may be used with the MDEF disclosed herein.

In an embodiment, a flow-assisted battery may comprise a battery housing, electrodes (e.g., one or more cathodes, one or more anodes), and an electrolyte solution; wherein the electrodes and the electrolyte solution are supported (e.g., located, disposed, etc.) within the battery housing. In an embodiment, the flow-assisted battery may further comprise a spacer, wherein the spacer is disposed between the anodes and the cathodes, thereby maintaining the anode and the cathode in a spaced relationship from each other (as opposed to touching each other, which would result in short-circuiting the battery).

In an embodiment, the MDEF comprises a powering device and an impeller assembly, wherein the powering device may be located outside (e.g., exterior to, in close proximity to, etc.) the battery housing (e.g., a dry side of the battery housing). The impeller assembly may comprise a shaft, an impeller, and a magnet, where the impeller assembly may be located inside the battery housing (e.g., a wet side of the battery housing). The impeller assembly and the powering device may be magnetically coupled through the housing. In an embodiment, the MDEF may provide a continuous flow of the electrolyte solution within the battery housing. The MDEF may be powered by an external source, by a battery (e.g., by the battery to which it is coupled), and/or to a plurality of batteries. Each of the components of the MDEF as well as methods of making and using same (e.g., powering device, impeller assembly, shaft, impeller, magnet, flow-assisted battery, electrodes, anode, cathode, spacer, active electrode materials, electrolyte compositions, etc.) will be described in more detail herein.

In an embodiment, the flow-assisted battery comprises a flow-assisted secondary nickel-zinc battery. In an embodiment, the flow-assisted secondary nickel-zinc battery comprises a battery housing, a Zn anode, a nickel oxide cathode, a spacer, and an electrolyte solution, wherein the electrodes (e.g., one or more Zn anodes, one or more nickel oxide cathodes) and the electrolyte solution are supported within the battery housing. In such embodiment, an MDEF may provide a continuous flow of electrolyte solution within the battery housing. In an embodiment, the electrolyte solution may be configured to freely flow between the Zn and nickel oxide electrodes. In an embodiment, the flow-assisted secondary nickel-zinc battery may further comprise a spacer, where the spacer is disposed between the Zn anode and the nickel oxide cathode, thereby maintaining the anode and the cathode in a spaced relationship from each other (as opposed to touching each other, which would result in short-circuiting the battery).

Without wishing to be limited by theory, the two electrodes (i.e., a Zn anode and a nickel oxide cathode) that are part of the flow-assisted secondary nickel-zinc battery have different electrochemical potentials which are dictated by the chemistry that occurs at each electrode. When such electrodes are connected to an external device, electrons flow from the more negative to the more positive potential electrode and electrical energy can be extracted by the external device/circuit. The charge balance in a flow-assisted secondary nickel-zinc battery can be maintained by the transport of ions through an ion transporter, such as for example an electrolyte. The net stoichiometry of the flow-assisted secondary nickel-zinc battery on discharge is given by the equations set forth below, wherein the standard cell potential associated with a flow-assisted secondary nickel-zinc battery is about 1.73 V:

| | $E^0$ |
|---|---|
| $2\ NiOOH + 2\ H_2O + 2e^- \rightarrow 2\ Ni(OH)_2 + 2\ OH^-$ | 0.49 V |
| $Zn + 2\ OH^- \rightarrow Zn(OH)_2 + 2e^-$ | 1.24 V |
| $2\ NiOOH + 2\ H_2O + Zn \rightarrow 2\ Ni(OH)_2 + Zn(OH)_2$ | 1.73 V |

Without wishing to be limited by theory, during the operating life of the battery, while the battery is in a discharging phase (e.g., the battery is producing energy, thereby acting as a galvanic cell), the nickel oxide electrode undergoes the cathodic reaction $2\ Ni^{3+} + 2e^- \rightarrow 2\ Ni^{2+}$ (e.g., reduction or gain of electrons), and the Zn electrode undergoes the anodic reaction $Zn^0 \rightarrow Zn^{2+} + 2e^-$ (e.g., oxidation or loss of electrons). Further, without wishing to be limited by theory, while the battery is in a recharging phase (e.g., the battery is consuming energy, thereby acting as an electrolytic cell), the current flow is reversed, the Zn electrode undergoes the cathodic reaction $Zn^{2+} + 2e^- \rightarrow Zn^0$ (e.g., reduction or gain of electrons), and the nickel oxide electrode undergoes the anodic reaction $2\ Ni^{2+} \rightarrow 2\ Ni^{3+} + 2e$ (e.g., oxidation or loss of electrons).

Further, as will be appreciated by one of skill in the art, and with the help of this disclosure, the number of electrodes in a flow-assisted secondary nickel-zinc battery is dependent upon the desired parameters for such flow-assisted secondary nickel-zinc battery. In an embodiment, the number and size of each of the electrodes (e.g., Zn anode, nickel oxide cathode) in a flow-assisted secondary nickel-zinc battery has to be chosen based on the properties of the electrodes, such that Zn anode and nickel oxide cathode capacities are approximately balanced.

The battery housing is configured to contain the electrodes (e.g., one or more Zn anodes, one or more nickel oxide cathodes), the electrolyte solution, and provide for a flow path for the circulation of the electrolyte solution. In an embodiment, the battery housing comprises a molded box or container that is generally non-reactive with respect to the electrolyte solution. In an embodiment, the battery housing comprises a polypropylene molded box, an acrylic polymer molded box, or the like.

In an embodiment, the nickel oxide cathode can be a sintered nickel oxide electrode or a pasted nickel oxide electrode. This cathode can also be in the form of an oxygen electrode or an air electrode. While the present disclosure will be discussed in the context of a nickel oxide cathode, it should be understood that other materials, such as for example any cathode material that can be successfully operated in alkaline electrolytes, including, but not limited to, nickel oxide, manganese dioxide, silver oxide, and air (oxygen) electrodes, can be used with the present invention. Without wishing to be limited by theory, nickel oxide as part of the nickel oxide cathode is an electrochemically active material, and will participate in a redox reaction, thereby contributing to the overall voltage of the battery.

In an embodiment, the nickel oxide cathode can be fabricated by using any suitable methodology. In one embodiment, a porous metallic nickel plaque is made from sintering a fine nickel powder. The porous plaque is then impregnated by either chemical or electrochemical means with nickel oxide. In another embodiment, the nickel oxide cathode comprises a foamed nickel metal substrate. A slurry consisting of nickel oxide powder, various other additives, a binder, and a solvent (typically water) is then pasted into the open foam structure. This composite is then dried, and calendared to a desired final thickness.

Generally, a binder functions to hold the electroactive (i.e., electrochemically active) material particles (e.g., nickel oxide used in cathode) together and in contact with the current collector. In an embodiment, the binder may comprise a polymer; a fluoropolymer, polytetrafluoroethylene (PTFE), a copolymer of tetrafluoroethylene and propylene; polyvinylidene fluoride (PVDF), a copolymer of styrene and butadiene, styrene-butadiene rubber (SBR); a conducting polymer, polyaniline, polypyrrole, poly(3,4-ethylenedioxylthiophene) (PEDOT), copolymers of 3,4-ethylenedioxylthiophene with various co-monomers (e.g., PEDOT with various dopants), a copolymer of 3,4-ethylenedioxylthiophene and styrenesulfonate (PEDOT:PSS), polyvinyl alcohol (PVA), hydroxymethyl cellulose (HMC), carboxymethyl cellulose (CMC), and the like, or combinations thereof. In an embodiment, the binder used in a non-flow cell Zn anode mixture comprises TEFLON, which is a PTFE commercially available from DuPont.

In an alternative embodiment, the nickel oxide cathode comprises a roll-bonded type nickel oxide cathode. In such embodiment, the electroactive materials are mixed with additives, a binder, and optionally a solvent, to form a cathode mixture. The cathode mixture is calendared, preferably in alternating length-wise and width-wise directions. This calendaring action leads to fibrillation of certain types of binder materials (notably PTFE), and leads to a fibrous web of binder which serves to hold the cathode mixture together, thereby forming a calendared cathode mixture. This calendared cathode mixture can then be pressed into a current collector.

In some embodiments, the current collector comprises a porous metal collector further comprising a variety of collector configurations, such as for example a metal conductive mesh, a metal conductive interwoven mesh, a metal conductive expanded mesh, a metal conductive screen, a metal conductive plate, a metal conductive foil, a metal conductive pierced foil, a metal conductive perforated plate, a metal conductive perforated foil, a metal conductive perforated sheet, a sintered porous metal conductive sheet, a sintered metal conductive foam, a porous metal conductive foam, an expanded conductive metal, a perforated conductive metal, and the like, or combinations thereof. In other embodiments, the current collector comprises a metal collector pocketed assembly, wherein different pockets of the assembly may comprise various electrode materials (e.g., nickel oxide cathode materials). Other current collector configurations will be apparent to one of skill in the art, and with the help of this disclosure.

In an embodiment, the current collector comprises a current collector substrate comprising graphite, carbon, a metal, an alloy, steel (e.g., 304, 316, 302, etc.), copper, nickel, silver, platinum, brass, or combinations thereof. In an embodiment, the current collector may further comprise a metal deposited (e.g., electroplated, electrodeposited, etc.) on the current collector substrate, such as for example nickel, silver, cadmium, tin, lead, bismuth, or combinations thereof. In an embodiment, the current collector comprises a nickel-plated steel mesh, an expanded nickel-plated steel mesh sheet, or combinations thereof.

In one embodiment, the nickel oxide cathode can be made by pasting an electroactive material mixture consisting of nickel oxide, conductive additives, binder, and solvent into a current collector comprising a porous metal conductive foam made of nickel. The solvent may be evaporated through heating, and the electrode can be calendared to a final thickness.

In an alternative embodiment, the nickel oxide cathode may comprise a current collector further comprising a porous nickel structure on top of a nickel screen, a perforated nickel sheet, or a perforated nickel plated steel sheet. In such embodiment, one method of creating such a porous structure is by sintering fine nickel powder on the metallic current collector substrate. Once the porous structure is created, nickel oxide can then be deposited in the pores of the porous structure. In one embodiment, nickel oxide may be deposited by either alternatively dipping the porous structure into an aqueous nickel salt solution and then into a caustic solution to precipitate the nickel oxide, or by placing the porous structure in a bath containing nickel nitrate at an appropriate pH (e.g., a pH of from about 3 to about 5), and then polarizing the porous substrate cathodically.

In an embodiment, the electrolyte solution comprises an ion transporter such as for example an aqueous battery electrolyte or an aqueous electrolyte. In an embodiment, the aqueous battery electrolyte comprises any suitable aqueous electrolyte with good ionic conductivity and with a pH value of about 14, alternatively less than about 14, alternatively less than about 13, or alternatively less than about 12. In the case of rechargeable batteries (e.g., flow-assisted secondary nickel-zinc batteries), the electrolyte is important both for the active/discharging cycle of the battery (while the battery supplies a current) and for the recharging cycle when Zn may be electrodeposited to replenish the anode material (e.g., Zn anode).

In an embodiment, the electrolyte solution comprises a hydroxide, (e.g., potassium hydroxide, sodium hydroxide, lithium hydroxide, and the like) and zinc oxide (ZnO), wherein the hydroxide can be present in a concentration of from about 1 wt. % to about 50 wt. %, alternatively from about 10 wt. % to about 40 wt. %, or alternatively from about 25 wt. % to about 35 wt. %, based on the total weight of the electrolyte solution; and the ZnO can be present in an amount of from about 1 g/L to about 300 g/L, alternatively from about 30 g/L to about 100 g/L, or alternatively from about 50 g/L to about 80 g/L. In an embodiment, the electrolyte solution comprises potassium hydroxide in a concentration of about 30 wt. %, based on the total weight of the electrolyte solution; and ZnO in an amount of about 60 g/L. The amount of ZnO in the electrolyte solution may vary depending on the charge-discharge state of the battery since the ZnO is generated by the discharge of the battery and consumed during the electrodeposition of Zn during the recharging cycle of the battery.

In an embodiment, the Zn anode comprises electrodeposited Zn and a current collector, wherein the Zn can be electrodeposited onto the current collector during the recharging cycle. While the present disclosure discusses the anodes in the context of Zn anodes, it should be understood that other materials, such as for example other metals, aluminum, nickel, magnesium, etc., may be used as anodes or anode materials. Without wishing to be limited by theory, Zn as part of the Zn anode is an electrochemically active material, and will participate in a redox reaction, thereby contributing to the overall voltage of the battery. As will be appreciated by one of skill in the art, and with the help of this disclosure, the current collector described as part of the nickel oxide cathode may also be used as the current collector for the Zn anode.

In an embodiment, the flow-assisted secondary nickel-zinc battery may be assembled by using any suitable methodology. In an embodiment, the flow-assisted secondary nickel-zinc battery may comprise at least one Zn anode and at least one nickel oxide cathode. In an embodiment, the non-flow secondary nickel-zinc battery may comprise more than one Zn anode and/or more than one nickel oxide cathode.

In an embodiment, non-flow secondary nickel-zinc battery may comprise electrodes which are supported within the battery housing. In an embodiment, the battery housing does not comprise any ports for fluid circulation outside the battery housing. In such embodiment, an MDEF may be used to circulate the fluid (e.g., electrolyte solution) within the battery housing, as will be described in detail later herein.

In an embodiment, one or more spacers could be used to physically separate the electrodes (e.g., Zn anode, nickel oxide cathode) in the flow-assisted secondary nickel-zinc battery. In an embodiment, the spacers may comprise materials which (i) are chemically stable in the flow-assisted cell electrolyte solution which is caustic (e.g., has a pH value of about 14) and (ii) have high electrical resistance. Nonlimiting examples of materials suitable for use in the spacers include polymers, plastics, nylon, acrylonitrile-butadiene-styrene copolymers (ABS), PTFE, acrylic polymers, polyolefins, polyvinyl chloride (PVC), sintered PVC, and the like.

In an embodiment, the spacers comprise spacer washers, spacer bars, tie rods, etc. In an embodiment, the spacer washers could be fixed to one or both of the positive and negative electrodes (e.g., Zn anode, nickel oxide cathode) and the respective electrodes could be formed with through-holes that could be aligned with the through-holes of the washers. In an embodiment, the spacer washers may have a thickness matching the desired spacing between adjacent electrodes (e.g., Zn anode, nickel oxide cathode), and the spacer washers could be affixed to surfaces of the electrodes (e.g., Zn anode, nickel oxide cathode) such that each pair of adjacent electrodes would be spaced from each other by the thickness of one spacer washer.

In an embodiment, each electrode (e.g., Zn anode, nickel oxide cathode) may have a matching pattern of spacer washers and through-holes such that when the electrodes (e.g., Zn anode, nickel oxide cathode) are stacked within the battery housing, the spacer washers and through-holes of all the electrodes would be aligned. In such embodiment, the tie rods could be inserted through the through-holes to assemble an electrode stack and keep the electrodes (e.g., Zn anode, nickel oxide cathode) aligned within the battery housing. In an embodiment, the tie rods could also be configured/used to support the electrode stack within the battery housing. For example, an inner surface of the battery housing could be formed with a lip or protrusion, wherein a row of tie rods could be seated on the lip to support the entire electrode stack within the battery housing.

In an alternative embodiment, the spacers could be arranged in a "window frame" configuration, wherein a series of longitudinal spacer bars could be fixed in a vertical, parallel relationship to one or both of the positive and negative electrodes (e.g., Zn anode, nickel oxide cathode). The spacer bars could be laterally spaced from each other to form vertical parallel flow channels between adjacent electrodes (e.g., Zn anode, nickel oxide cathode).

In another embodiment, the spacers could be arranged in a serpentine configuration, wherein a continuous serpentine flow channel could be formed between adjacent electrodes. In such embodiment, vertical spacer bars having a length shorter than a length of their adjacent electrode would connect to horizontal spacer bars to block the ends of the flow channels formed by the vertical spacer bars. As a result, a continuous serpentine flow path could be created beginning at one corner of the electrode (e.g., Zn anode, nickel oxide cathode) and terminating at an opposite corner.

In yet another embodiment, the electrodes (e.g., Zn anode, nickel oxide cathode) comprise spacers in the form of insulating protuberances, wherein the insulating protuberances could be insulating spheres, which are press-fit, for example in apertures formed in the electrode (e.g., Zn anode, nickel oxide cathode). In such embodiment, a design of the spacers could determine a flow pattern and characteristics of the electrolyte solution. Nonlimiting examples of flow patterns that could be created by using various spacer designs include serpentine flow, linear flow between the electrodes, series/parallel flow combinations between the electrodes, etc.

In still yet an embodiment, the spacers may be configured to snap together through the negative electrode, thereby creating an assembly that may be stacked alternately with positive electrodes to form the electrode stack. In such embodiment, the assembly process is simple and effective. The spacers provide support for the electrodes (e.g., Zn anode, nickel oxide cathode) so that the gap between opposing positive and negative electrodes remains consistent and constant over the lifetime of the flow-assisted secondary nickel-zinc battery, which may prevent a short-circuit in the flow-assisted secondary nickel-zinc battery. The electrode stack may be integrated into a funnel or funnel assembly, as will be described in more detail later herein, that may provide a method for producing approximately equivalent flow (e.g., even flow) through the flow channels in the electrode stack. As will be appreciated by one of skill in the art, and with the help of this disclosure, the spacers create the flow channels present in the electrode stack.

In still yet an embodiment, the spacer may comprise a sintered PVC separator, which sintered PVC separator has ribs running down its height. These ribs may act in the same way as the spacers that snap together through the negative electrode, while also protecting the positive electrode (e.g., nickel oxide cathode) from short-circuiting. In such embodiment, the electrode stack may be integrated into a funnel or funnel assembly, as will be described in more detail later herein. Other spacers and spacer configuration suitable for use in the present disclosure will be appreciated by one of skill in the art, and with the help of this disclosure.

In an embodiment, the flow-assisted secondary nickel-zinc battery may further comprise a catalytic plate disposed at the bottom of the battery housing, wherein the catalytic plate may collect isolated zinc falling from the Zn anode. The catalytic plate may comprise pure nickel metal, nickel coated steel, or steel coated with small amounts of catalysts intended to promote hydrogen evolution. Without wishing to be limited by theory, when the isolated zinc falls and rests on the catalytic plate, a local corrosion cell is created, with the net effect of hydrogen evolution occurring on the plate, and corrosion and dissolution of the isolated zinc. In an embodiment, the catalytic plate may remove at least a portion of the metallic zinc which has become detached by any reason from the Zn anode. In an embodiment, the catalytic plate may remove all of the metallic zinc which has become detached by any reason from the Zn anode. In an alternative embodiment, the catalytic plate may be electrically connected to the nickel oxide cathode, thereby readily dissolving any metallic zinc solids reaching the catalytic plate.

In an embodiment, the flow-assisted secondary nickel-zinc battery may further comprise an electric bus, which may be located at the top of the flow-assisted secondary nickel-zinc battery. The electrical bus may provide a means for electrically connecting the electrodes (e.g., Zn anode, nickel oxide cathode) to an electrical circuit outside the battery housing, thereby enabling the ability of the flow-assisted secondary nickel-zinc battery to produce energy during discharging and to be recharged during recharging.

In an embodiment, during a cycle of operation of the flow-assisted secondary nickel-zinc battery the ZnO of the electrolyte solution can be deposited as metallic Zn on the current collectors of the anodes during charging. As the flow-assisted secondary nickel-zinc battery discharges in use, the metallic zinc deposited on the current collectors of the Zn anodes can be oxidized to form a zinc oxide, which then dissolves back into the electrolyte solution.

In an embodiment, the electrolyte solution may be continuously circulated within the battery housing by using an MDEF as will be described herein, thereby keeping the electrolyte solution well stirred and ensuring an even, homogenous mixture and temperature of the electrolyte solution. Without wishing to be limited by theory, the concentration of zinc species (e.g., ZnO) in the electrolyte solution decreases during charging of the flow-assisted secondary nickel-zinc battery, and the continuous circulation of the electrolyte solution maintains the concentration of the zinc species relatively uniform throughout the solution, thereby minimizing Zn dendrite formation and ensuring an uniform deposition of Zn onto the Zn anode.

In an embodiment, continuous circulation of the electrolyte solution within the battery housing may allow complete dissolution of all Zn from the Zn anode during discharge. In such embodiment, the flow-assisted secondary nickel-zinc battery can be subjected to a reconditioning cycle, wherein all Zn could be dissolved/removed from the Zn anode, thereby allowing the Zn anode to return to its original condition (e.g., a condition prior to utilizing the flow-assisted secondary nickel-zinc battery). In an embodiment, the reconditioning cycle can be performed at various time (e.g., periodically, at scheduled times, when needed, etc.) during a life of the flow-assisted secondary nickel-zinc battery to improve performance of the battery and lengthen the life of the battery. In an embodiment, the reconditioning cycle can be performed at least once every 20 charge/discharge cycles, alternatively at least once every 25 charge/discharge cycles, or alternatively at least once every 30 charge/discharge cycles. In some embodiments, the reconditioning cycle may be performed when one or more operational parameters of the battery drop below a threshold.

In an embodiment, the flow-assisted secondary nickel-zinc battery could be operated as a closed-loop system, wherein any gases evolved from the electrodes (oxygen from the nickel oxide cathode and hydrogen from the Zn anode) may be recombined to form water, thereby ensuring a constant water inventory in the flow-assisted secondary nickel-zinc battery over its life. In an embodiment, small pieces of catalyst could be placed within an electrolyte-free headspace of the flow-assisted secondary nickel-zinc battery, thereby reducing the pressure during a closed system operation. Without wishing to be limited by theory, the pressure reduction is due to the recombining of hydrogen and oxygen generated during the operation of the flow-assisted secondary nickel-zinc battery.

In an embodiment, a method of producing energy may comprise the steps of: (i) providing a flow-assisted secondary nickel-zinc battery assembled as disclosed herein; (ii) charging the flow-assisted secondary nickel-zinc battery to a charge voltage, wherein ZnO from the electrolyte solution is deposited as electrodeposited Zn on the current collector of the Zn anode; (iii) discharging the flow-assisted secondary nickel-zinc battery to a discharge voltage to produce energy, wherein at least a portion of the electrodeposited Zn of the Zn anode is oxidized and transferred back into the electrolyte solution; (iv) optionally further discharging the flow-assisted secondary nickel-zinc battery to a final voltage below said discharge voltage, wherein the electrodeposited Zn of the Zn anode is completely removed from the Zn anode; and (v) continuously circulating the electrolyte solution within the battery housing during said steps of charging, discharging and further discharging the flow-assisted secondary nickel-zinc battery to said final voltage by using an MDEF, wherein the electrodeposited Zn is stripped and re-deposited on the current collector of the Zn anode.

In an embodiment, the flow-assisted battery comprises a flow-assisted secondary Zn—MnO$_2$ battery. In an embodiment, the flow-assisted secondary Zn—MnO$_2$ battery comprises a battery housing, a Zn anode, a MnO$_2$ cathode, a spacer, and an electrolyte solution, wherein the electrodes (e.g., one or more Zn anodes, one or more MnO$_2$ cathodes) and the electrolyte solution are supported within the battery housing. In such embodiment, an MDEF may provide a continuous flow of electrolyte solution within the battery housing. In an embodiment, the electrolyte solution may be configured to freely flow between the Zn and MnO$_2$ electrodes. As will be appreciated by one of skill in the art, and with the help of this disclosure, except for the $MnO_2$ cathode, all other elements of the flow-assisted secondary Zn—$MnO_2$ battery, such as for example assembling, configurations, battery housing, Zn anode, spacers, and electrolyte solution, may be used as described for the flow-assisted secondary nickel-zinc battery. Further, as will be appreciated by one of skill in the art, and with the help of this disclosure, the redox reactions for the flow-assisted secondary Zn—$MnO_2$ battery are different than the redox reactions for the flow-assisted secondary nickel-zinc battery, and consequently the standard cell potential associated with a flow-assisted secondary Zn—$MnO_2$ battery is about 1.43 V (as opposed to the standard cell potential of 1.73 V associated with a flow-assisted secondary nickel-zinc battery).

In an embodiment, the $MnO_2$ cathode comprises a $MnO_2$ cathode mixture and a current collector, wherein the $MnO_2$ cathode mixture comprises $MnO_2$, an electronically conductive material, and a binder. As will be appreciated by one of skill in the art, and with the help of this disclosure, the current collector and the binder described as part of the flow-assisted secondary nickel-zinc battery may also be used as the current collector and the binder for the $MnO_2$ cathode. In an embodiment, the binder used in a $MnO_2$ cathode mixture comprises TEFLON. In an alternative embodiment, the binder used in a $MnO_2$ cathode mixture comprises TEFLON, PEDOT, PSS, PEDOT:PSS, and/or any combination thereof.

In an embodiment, the $MnO_2$ comprises electrolytic manganese dioxide (EMD) grade powder. Nonlimiting examples of electronically conductive material suitable for use in this disclosure include carbon, graphite, graphite powder, graphite powder flakes, graphite powder spheroids, carbon black, activated carbon, conductive carbon, amorphous carbon, glassy carbon, and the like, or combinations thereof. As will be appreciated by one of skill in the art, and with the help of this disclosure, $MnO_2$ has low electronic or electrical conductivity, hence the electronically conductive material is used in the $MnO_2$ cathode mixture as a conducting agent, e.g., to enhance the overall electronic conductivity of the $MnO_2$ cathode.

In an embodiment, the $MnO_2$ cathode mixture may further comprise additives, such as for example metals, Bi, Sr, Ca, Ba, oxides thereof, hydroxides thereof, nitrates thereof, chlorides thereof, and the like, or combinations thereof.

In an embodiment, the $MnO_2$ cathode comprises a roll-bonded type $MnO_2$ cathode. In such embodiment, the electroactive materials are mixed with additives, a binder, and optionally a solvent, to form a $MnO_2$ cathode mixture. The $MnO_2$ cathode mixture is calendared, preferably in alternating length-wise and width-wise directions. This calendaring action leads to fibrillation of certain types of binder materials (notably PTFE), and leads to a fibrous web of binder which serves to hold the $MnO_2$ cathode mixture together, thereby forming a calendared $MnO_2$ cathode mixture. This calendared $MnO_2$ cathode mixture can then be pressed into a current collector.

In an embodiment, the MDEF used in a flow-assisted battery comprises a powering device and an impeller assembly, wherein the impeller assembly may comprise a shaft, an impeller, and a magnet. The powering device may be located outside the battery housing (e.g., a dry side of the battery housing), and the impeller assembly may be located inside the battery housing (e.g., a wet side of the battery housing). The MDEF may provide a continuous flow of the electrolyte solution within the battery housing. While the present disclosure will be discussed in detail in the context of MDEFs comprising a shaft that connects to (e.g., supports, couples to, etc.) an impeller, it should be understood that other MDEF configurations, such as for example a shaftless MDEF, may be used for providing a continuous flow of the electrolyte solution within the battery housing of a flow-assisted battery. Further, while the present disclosure will be discussed in detail in the context of MDEFs comprising an impeller, it should be understood that any other suitable mixing mechanism and/or device may be used for providing a continuous flow of the electrolyte solution within the battery housing of a flow-assisted battery.

In an embodiment, the MDEF may comprise a powering device and an impeller assembly, wherein the powering device may be located outside the battery housing (e.g., a dry side of the battery housing, an outer surface of the battery housing, etc.). The powering device may be coupled (e.g., joined, affixed, secured, connected, fastened, attached, etc.) onto an outer surface of the battery housing. In an embodiment, the powering device may impart a rotational motion to (e.g., spin, rotate, turn, revolve, gyrate, twirl, etc.) a shaft and/or impeller through the housing, thereby providing a continuous flow of the electrolyte solution within the battery housing of a flow-assisted battery. In an embodiment, the impeller assembly may be located/supported within the battery housing. In an embodiment, an MDEF may further comprise an impeller case, wherein the impeller case may be integrated within a racking structure of electrodes (e.g., anodes, cathodes) of the flow-assisted battery.

In an embodiment, the MDEF comprises a powering device comprising a magnetic drive system, wherein the magnetic drive system may impart a rotational motion to one or more impellers by using rotating magnetic fields, thereby causing the electrolyte solution to flow between electrode plates and/or within flow channels between electrode plates, wherein the electrode plates may be part of the electrode stack of the flow-assisted battery. In such embodiment, the impeller case may share parts (e.g., a wall, a surface, etc.) with a racking structure of electrodes and/or an electrode casing (e.g., a casing supporting the electrodes). In some embodiments, the impeller may be coupled to the shaft, wherein the shaft comprises a fixed or permanent magnet. In other embodiments, the impeller assembly may comprise a magnet, wherein the magnet allows for the magnetic coupling of the impeller assembly to the powering device. In an embodiment, the impeller, the shaft, and any magnets used for magnetically coupling the impeller assembly to the powering device are supported within the battery housing.

In an embodiment, a powering device of an MDEF may comprise a motor that may impart a rotational motion to one or more exterior magnets. In such embodiment, the exterior magnet may be magnetically coupled to one or more interior magnets, wherein the interior magnets are fixed (e.g., connected, coupled, affixed, attached, joined, affixed, secured, fastened, attached, etc.) to the shaft and/or the impeller. As will be appreciated by one of skill in the art, and with the help of this disclosure, the terms "exterior" and "interior" are used with respect to the battery housing; for example, an exterior magnet is located outside (e.g., on an exterior or dry side of) the battery housing, while an interior magnet is located inside (e.g., on an interior or wet side of) the battery housing. In an embodiment, the rotational motion of the exterior magnet may cause a rotational motion of the interior magnet, thereby causing the shaft and/or the impeller to rotate.

In an embodiment, the exterior magnet and/or the interior magnet may have a cylindrical (e.g., tubular) geometry, wherein at least a portion of the interior magnet may be placed inside at least a portion of the exterior magnet, as seen in the embodiment of FIG. 1. Cylindrical magnets are commonly referred to as "ring magnets." Referring to the embodiment of FIG. 1, an MDEF 101 is shown integrated with a flow-assisted battery. The flow-assisted battery comprises a battery housing 10, an electrode stack 20 and an electrolyte solution 30, wherein the electrode stack 20 and the electrolyte solution 30 are supported within the battery housing 10. A powering device 40 (e.g., a motor) may be coupled onto an outer surface of the battery housing 10, such as for example on a surface located at a top part of the battery housing 10. A shaft 50 may be coupled to an impeller 60, wherein at least a portion of the impeller 60 may be located in an impeller case 70. A detail 40a of the powering device 40 is shown on the left side in FIG. 1, wherein an exterior magnet 41 is fixed/connected to at least a portion of a surface of the powering device 40, and wherein an interior magnet 51 is fixed to at least a portion of a surface of the shaft 50. The powering device 40 imparts a rotational motion to the exterior magnet 41, and the rotational motion of the exterior magnet 41 may cause a rotational motion of the interior magnet 51 due to the magnetic coupling, thereby causing the shaft 50 and the impeller 60 to rotate.

Figure 2:
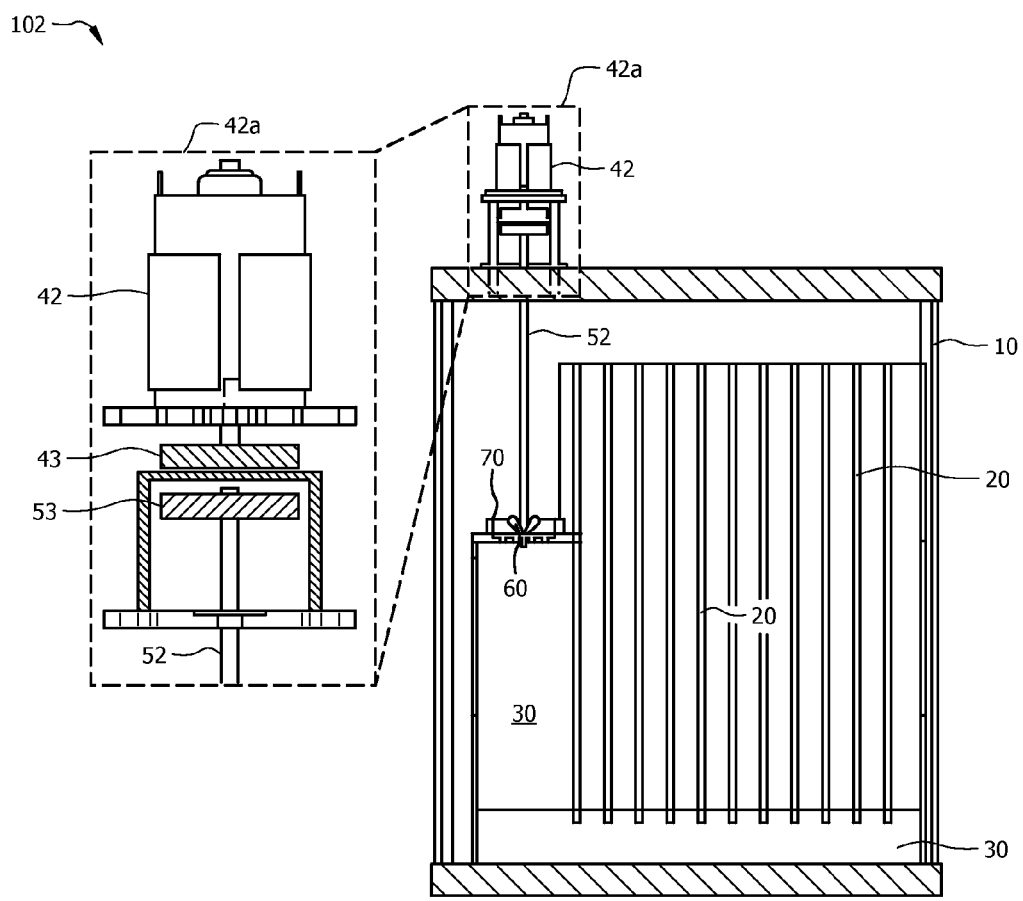
FIG. 2 displays a cross-section schematic of an embodiment of an MDEF showing coupling via disc magnets.

In an embodiment, the exterior magnet and/or the interior magnet may have a disc (e.g., disk, circular) geometry, wherein at least a portion of an outer surface of the interior magnet may face at least a portion of an outer surface of the exterior magnet, as seen in the embodiment of FIG. 2. Referring to the embodiment of FIG. 2, an MDEF 102 is shown integrated with a flow-assisted battery. The flow-assisted battery comprises a battery housing 10, an electrode stack 20 and an electrolyte solution 30, wherein the electrode stack 20 and the electrolyte solution 30 are supported within the battery housing 10. A powering device 42 (e.g., a motor) may be coupled onto an outer surface of the battery housing 10, such as for example on a surface located at a top part of the battery housing 10. A shaft 52 may be coupled to an impeller 60, wherein at least a portion of the impeller 60 may be located in an impeller case 70. A detail 42a of the powering device 42 is shown on the left side in FIG. 2, wherein an exterior magnet 43 is fixed to at least a portion of a surface of the powering device 42, and wherein an interior magnet 53 is fixed to at least a portion of a surface of the shaft 52. The powering device 42 imparts a rotational motion to the exterior magnet 43, and the rotational motion of the exterior magnet 43 causes a rotational motion of the interior magnet 53, thereby causing the shaft 52 and the impeller 60 to rotate.

In an embodiment, the powering device of an MDEF may comprise an electronic speed controller (ESC), which may be similar to a brushless DC motor. In an alternative embodiment, the powering device of an MDEF may comprise a polyphase (e.g., three-phase, two-phase) AC electrical power system. In an embodiment, the electronic speed controller and/or the polyphase electrical power system may comprise one or more electromagnets, which will be referred to as "exterior electromagnets" or simply "electromagnets." The exterior electromagnets may be magnetically coupled with one or more interior magnets and/or electromagnets (forming, e.g., a squirrel cage rotor). In an embodiment, the interior magnets and/or interior electromagnets are fixed to the shaft and/or the impeller. In an embodiment, operation of the exterior electromagnets may cause the interior magnets to rotate, thereby causing the shaft and/or the impeller to rotate.

Figure 3:
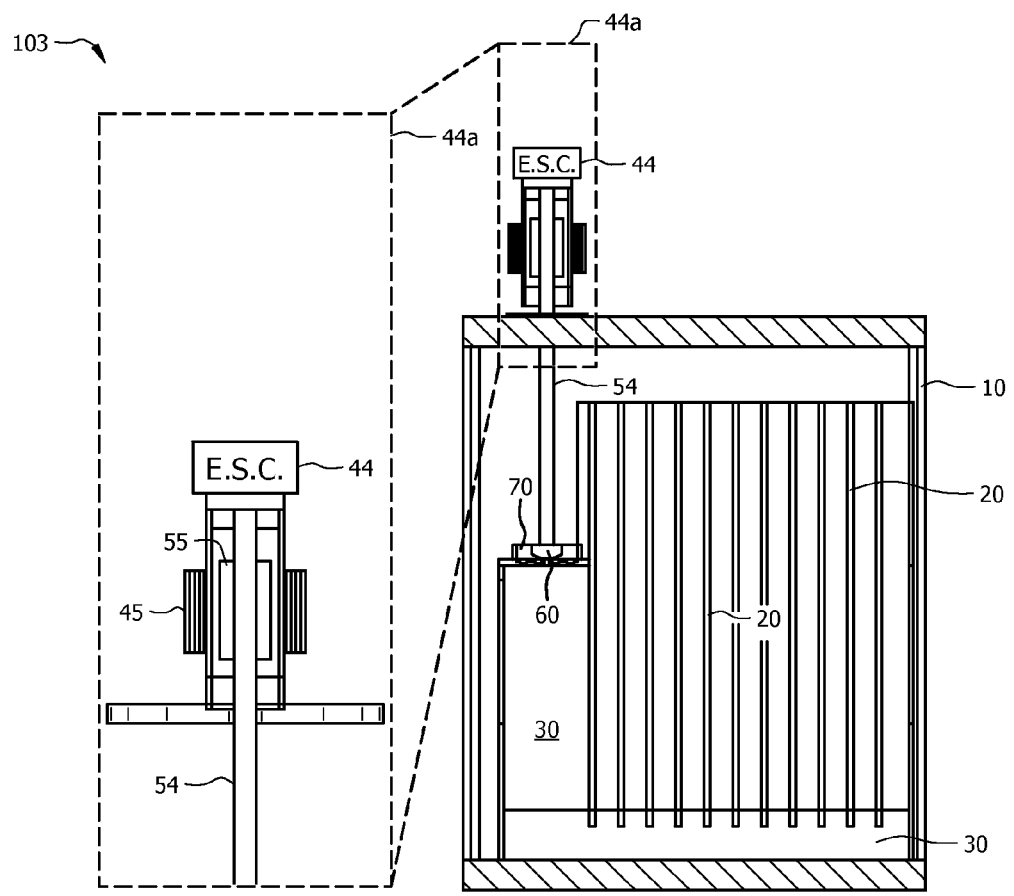
FIG. 3 displays a cross-section schematic of an embodiment of an MDEF showing coupling via an electromagnet and a magnet.

In an embodiment, the powering device may comprise an electronic speed controller, wherein the powering device may be magnetically coupled to an interior magnet, as seen in the embodiment of FIG. 3. Referring to the embodiment of FIG. 3, an MDEF 103 is shown integrated with a flow-assisted battery. An electronic speed controller 44 may be coupled onto an outer surface of the battery housing 10, such as for example on a surface located at a top part of the battery housing 10. A shaft 54 may be coupled to an impeller 60, wherein at least a portion of the impeller 60 may be located in an impeller case 70. A detail 44a of the electronic speed controller 44 is shown on the left side in FIG. 3, wherein the electronic speed controller 44 comprises an exterior electromagnet 45 magnetically coupled to an interior magnet 55, and wherein the interior magnet 55 is fixed to at least a portion of a surface of the shaft 54. The exterior electromagnet 45 imparts a rotational motion to the interior magnet 55, thereby causing the shaft 54 and the impeller 60 to rotate.

Figure 4:
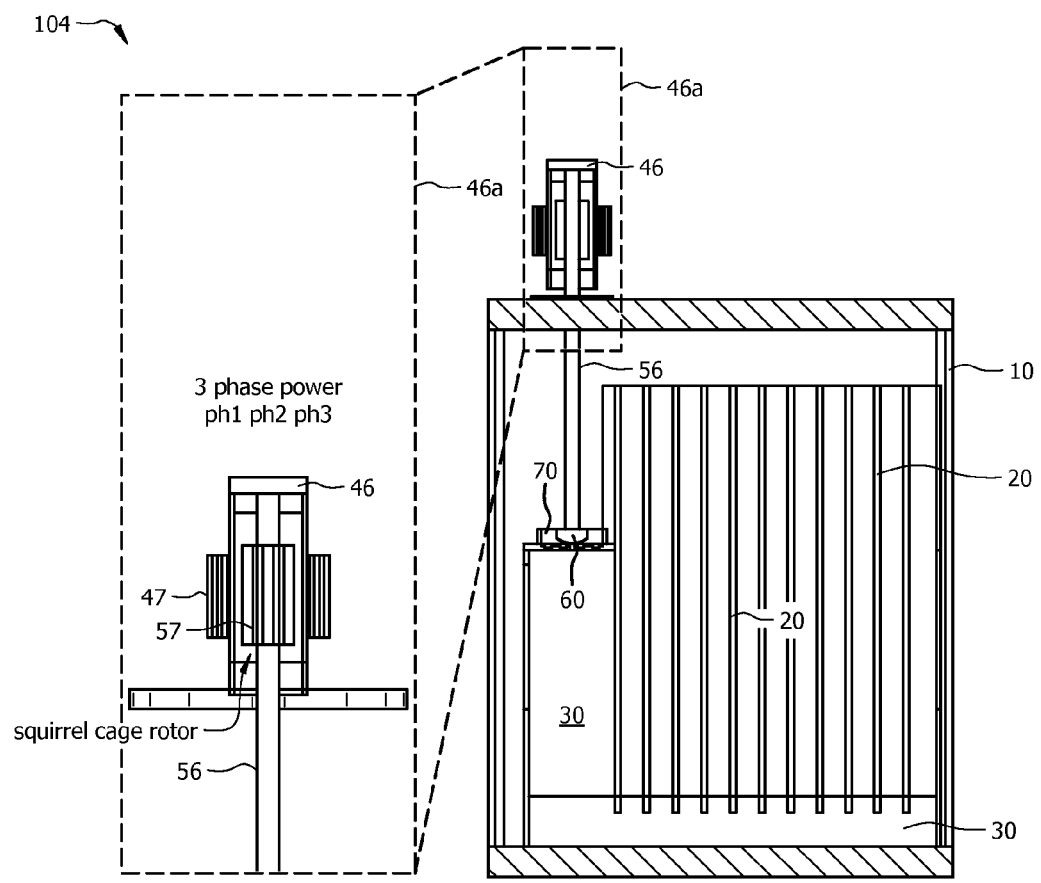
FIG. 4 displays a cross-section schematic of an embodiment of an MDEF showing coupling via an electromagnet.

In an embodiment, the powering device may comprise a three-phase AC electrical power system, wherein the powering device may be magnetically coupled to a squirrel cage rotor on the shaft, as seen in the embodiment of FIG. 4. Referring to the embodiment of FIG. 4, an MDEF 104 is shown integrated with a flow-assisted battery. A three-phase AC electrical power system 46 may be coupled onto an outer surface of the battery housing 10, such as for example on a surface located at a top part of the battery housing 10. A shaft 56 may be coupled to an impeller 60, wherein at least a portion of the impeller 60 may be located in an impeller case 70. A detail 46a of the three-phase AC electrical power system 46 is shown on the left side in FIG. 4, wherein the three-phase AC electrical power system 46 comprises an exterior electromagnet 47 magnetically coupled to a squirrel cage rotor 57, and wherein the squirrel cage rotor 57 is fixed to at least a portion of a surface of the shaft 56. The exterior electromagnet 47 imparts a rotational motion to the squirrel cage rotor 57, thereby causing the shaft 56 and the impeller 60 to rotate.

In an embodiment, the powering device of an MDEF may be used to drive (e.g., promote motion in, impart motion to, set in motion, move, etc.) an impeller assembly comprising a submersed centrifugal impeller (e.g., a submersed centrifugal pump), wherein the centrifugal impeller may circulate the electrolyte solution by pumping, thereby providing a continuous flow of electrolyte solution. In such embodiment, the powering device may comprise any suitable powering device, a magnetic drive, such as for example the powering device of FIG. 1, FIG. 2, FIG. 3, or FIG. 4, e.g., a motor that may impart a rotational motion to one or more exterior magnets, an electronic speed controller, a polyphase (e.g., three-phase, two-phase) AC electrical power system, etc.

Figure 5:
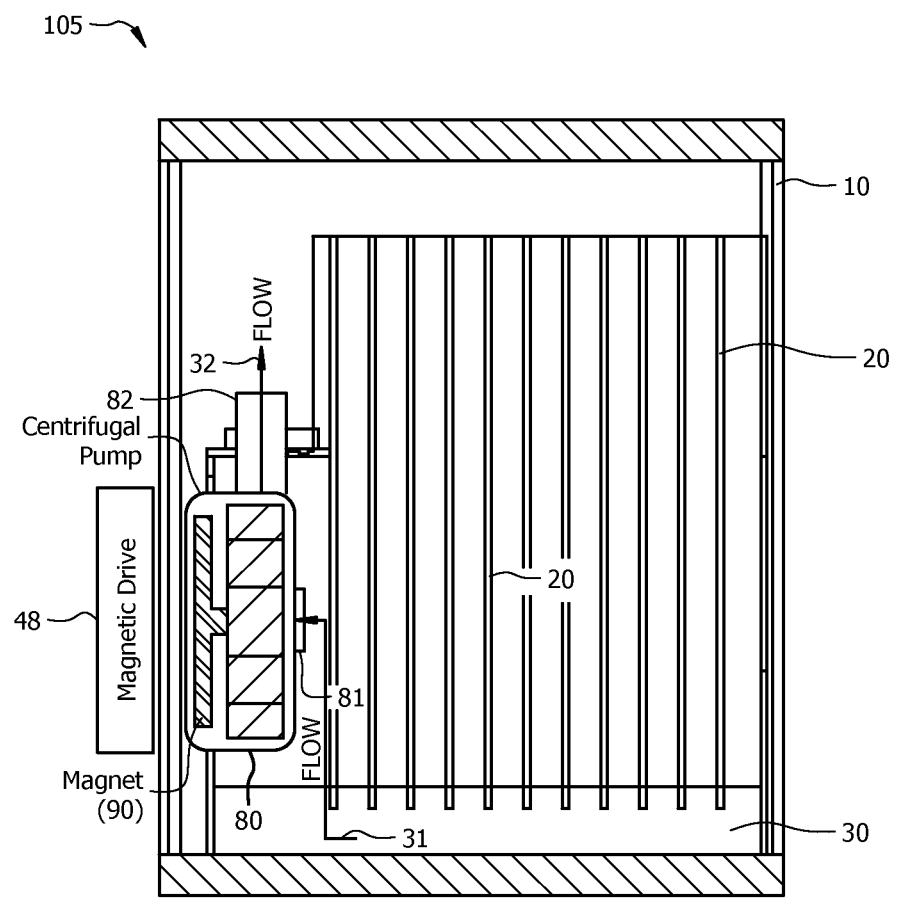
FIG. 5 displays a cross-section schematic of an embodiment of a side-mounted MDEF.

In an embodiment, the powering device may comprise a magnetic drive 48, as seen in the embodiment of FIG. 5. Referring to the embodiment of FIG. 5, an MDEF 105 is shown integrated with a flow-assisted battery. The magnetic drive 48 may be coupled onto an outer surface of the battery housing 10, such as for example on a surface located on a side of the battery housing 10. A centrifugal impeller 80 may be submersed in (e.g., completely covered by) the electrolyte solution 30, wherein the centrifugal impeller 80 is supported within the battery housing 10. The centrifugal impeller 80 may comprise a magnet 90 (e.g., a fixed magnet), wherein the magnetic drive 48 may impart a rotational motion to the magnet 90, thereby causing the electrolyte solution 30 to enter an inlet port 81 of the centrifugal impeller 80 and exit through an outlet port 82 of the centrifugal impeller 80, according to an electrolyte solution inflow arrow 31 and an electrolyte solution outflow arrow 32, respectively. As will be appreciated by one of skill in the art, and with the help of this disclosure, the centrifugal impeller may be configured such that the electrolyte solution flow arrows are reversed, e.g., the electrolyte solution may also flow in a downward direction, as opposed to the upward direction shown in FIG. 5.

In an embodiment, the powering device of an MDEF may be used to rotate a magnetic impeller, such as for example a stirring element, thereby causing the electrolyte solution to flow within the battery housing. In such embodiment, the powering device may comprise any suitable powering device, a magnetic drive, such as for example the powering device of FIG. 1, FIG. 2, FIG. 3, or FIG. 4, e.g., a motor that may impart a rotational motion to one or more exterior magnets, an electronic speed controller, a polyphase (e.g., three-phase, two-phase) AC electrical power system, etc. In an embodiment, the powering device comprises a magnetic drive analogous or similar to the magnetic drive systems that may be found in laboratory magnetic stirrers. Some magnetic stirrer drive systems consist of a motor that rotates a set of fixed magnets, while other magnetic stirrer drive systems use electromagnets to generate a rotating magnetic field, and any such configurations may be used with the MDEF disclosed herein.

Figure 6:
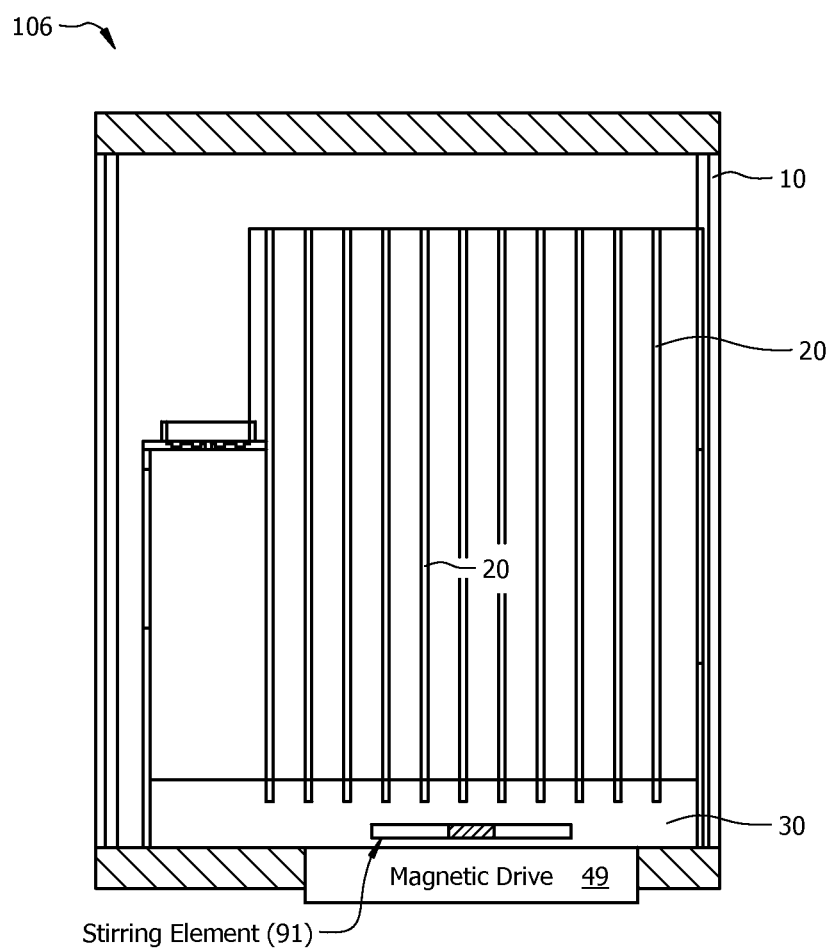
FIG. 6 displays a cross-section schematic of an embodiment of a bottom-mounted MDEF.

In an embodiment, the powering device may comprise a magnetic drive 49, as seen in the embodiment of FIG. 6. Referring to the embodiment of FIG. 6, an MDEF 106 is shown integrated with a flow-assisted battery. The magnetic drive 49 may be coupled onto an outer surface of the battery housing 10, such as for example on a surface located on a bottom side of the battery housing 10. A magnetic impeller 91 (e.g., stirring element) may be submersed in (e.g., completely covered by) the electrolyte solution 30, wherein the magnetic impeller 91 is supported within the battery housing 10. The magnetic drive 49 may impart a rotational motion to the magnetic impeller 91, thereby causing the electrolyte solution 30 to continuously circulate within the battery housing 10. As noted in FIG. 6, the MDEF may be located at various positions within the housing 10. For example, the impeller or other pumping device may be located at the top, one a side, and/or at a bottom of the housing 10.

Figure 7:
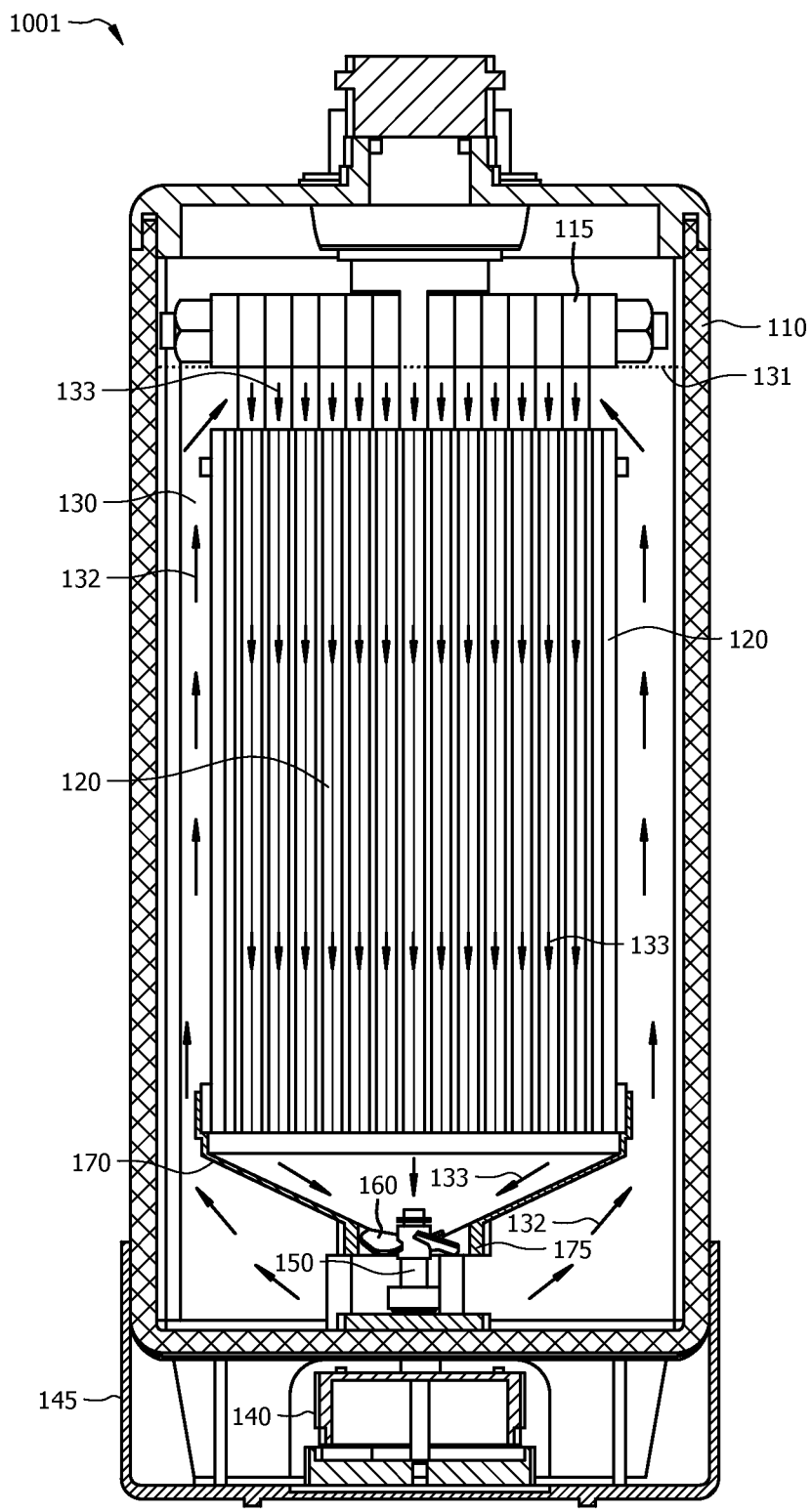
FIG. 7 displays a side cross-section schematic of an embodiment of a bottom-mounted MDEF in a flow-assisted battery.

FIG. 7 illustrates another embodiment of an MDEF. Referring to the embodiment of FIG. 7, a side cross-section of an MDEF 1001 integrated with a flow-assisted battery (e.g., flow-assisted secondary nickel-zinc battery) is shown. The flow-assisted battery comprises a battery housing 110, an electrode stack 120 and an electrolyte solution 130, wherein the electrode stack 120 and the electrolyte solution 130 are supported within the battery housing 110, wherein a typical electrolyte solution level 131 within the battery housing 110 is shown. The electrode stack 120 may further comprise an electric bus 115 located above the electrode stack 120, wherein the electrode stack comprises electrolyte flow channels located between opposing electrodes. In an embodiment, the electrode stack 120 may further comprise a funnel 170 located below the electrode stack 120, wherein the funnel may have a dual function, e.g., support the electrode stack 120 within the battery housing 110 and direct electrolyte solution 130 flow. The funnel 170 may further comprise a funnel neck 175. In an embodiment, at least a portion of an impeller 160 may be located within the funnel neck 175. The impeller 160 may be connected to a shaft 150 that may comprise one or more interior magnets.

In an embodiment, a motor 140 (e.g., a brushless DC (BLDC) motor) may be located on a bottom side (e.g., a dry side) of the flow-assisted battery. The motor 140 can be enclosed for protection in a removable motor casing 145. The motor casing 145 and the motor 140 may both be removable, which may allow for maintenance and/or replacement. In an embodiment, the motor 140 comprises exterior magnets attached to a rotor that can rotate the exterior magnets. The rotation may produce a magnetic field which in turn rotates the interior magnets of the shaft 150, thereby rotating the impeller 160. The impeller 160 may comprise any number of blades, for example from two to 6 blades, that may have a variable or fixed pitch (e.g., a pitch between about 10 degrees and about 60 degrees, between about 30 degrees and about 50 degrees, or about 45 degrees). The rotation of the impeller 160 may result in the movement of the electrolyte solution 130 according to the upward electrolyte solution flow arrows 132 and to the downward electrolyte solution flow arrows 133. As will be appreciated by one of skill in the art, and with the help of this disclosure, the rotation of the impeller 160 may be configured such that the electrolyte solution flow arrows are reversed, e.g., the electrolyte solution may also flow in an upward direction through the electrode stack 120 and in a downward direction around the electrode stack 120, as opposed to the direction of the electrolyte solution flow arrows shown in FIG. 7.

Figure 8:
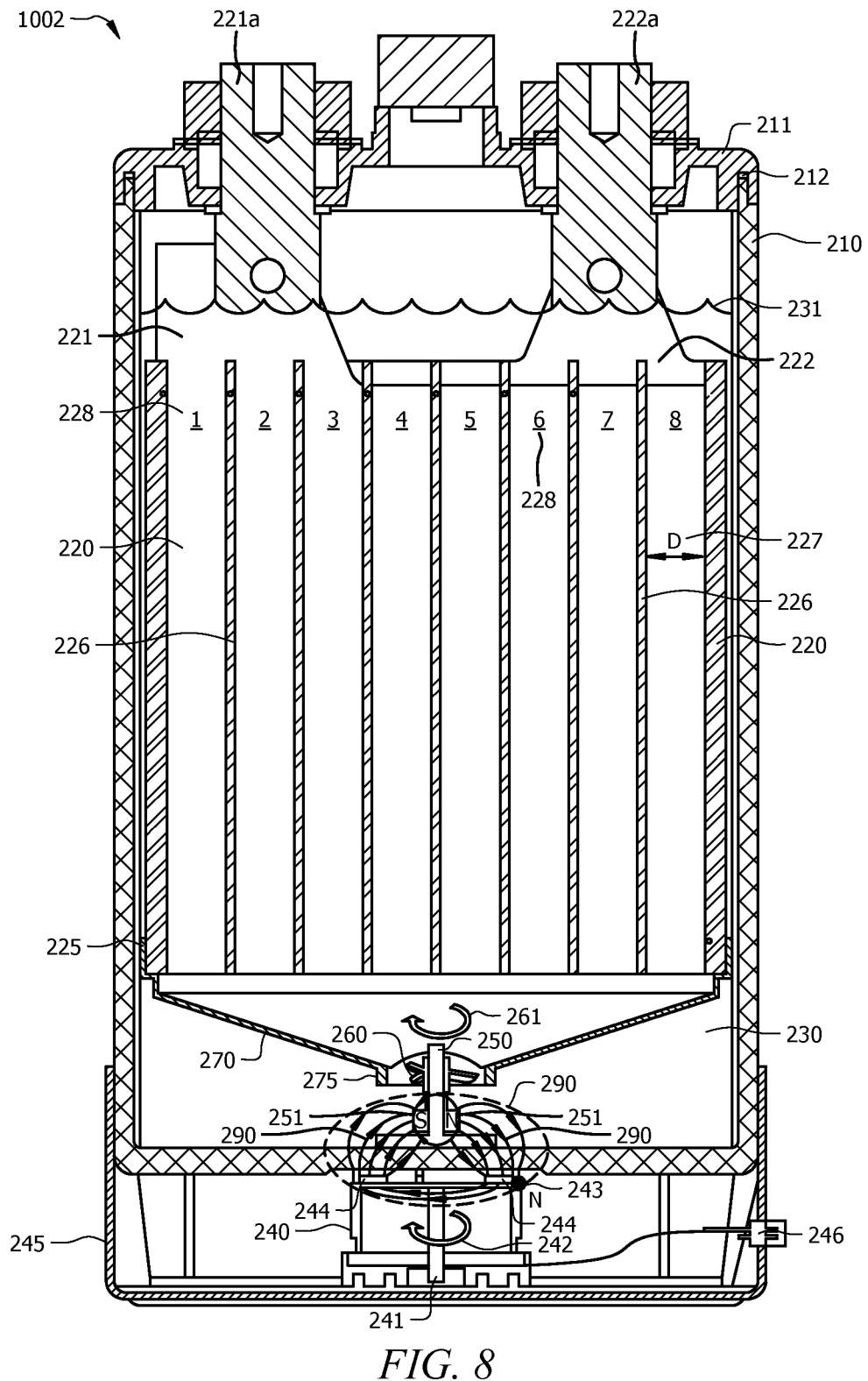
FIG. 8 displays a side cross-section schematic of an embodiment of a bottom-mounted MDEF in a flow-assisted battery, showing magnetic field lines.

Referring to the embodiment of FIG. 8, a side cross-section of an MDEF 1002 integrated with a flow-assisted battery (e.g., a flow-assisted secondary nickel-zinc battery) is shown. The flow-assisted battery comprises a battery housing 210, an electrode stack 220 and an electrolyte solution 230, wherein the electrode stack 220 and the electrolyte solution 230 are supported within the battery housing 210, wherein a typical electrolyte solution level 231 within the battery housing 210 is shown. The battery housing 210 comprises a container lid 211 located at the top of the battery housing 210, and a lid seal 212 (e.g., an O-ring seal) is disposed between the battery housing 210 and the container lid 211. The electrode stack 220 comprises a cathode 222 (e.g., a nickel oxide cathode, a manganese dioxide cathode, etc.) and an anode 221 (e.g., a Zn anode), wherein the cathode 222 is shown positioned behind the anode 221 in the embodiment of FIG. 8. The anode 221 may be connected to an anode terminal bolt 221a. The cathode 222 may be connected to a cathode terminal bolt 222a. The anode terminal bolt 221a and the cathode terminal bolt 222a may serve to provide an external electrical connection for the flow-assisted battery during charging and/or discharging the battery. The electrode stack 220 comprises spacers 226 (e.g., plastic spacers, polymeric spacers, etc.), wherein the spacers 226 physically separate the electrodes (e.g., anode 221, cathode 222), thereby creating flow channels 228 for the flow of the electrolyte solution through the electrode stack 220 (e.g., between the electrodes). As it can be seen in FIG. 8, 8 flow channels 228 numbered 1 through 8 are created within the electrode stack 220, wherein the flow channels 228 have an approximately equal width D 227 arising from an approximately equal spacing D 227 between the spacers 226. The dimension D 227 may be optimized to allow the spacers to provide a proper support to the electrodes (e.g., anode 221, cathode 222), such that a separation between electrodes (e.g., anode 221, cathode 222) remains about constant during the life time of the flow-assisted battery. In an embodiment, the spacing between the spacers is from about 0.1 mm to about 20 mm, alternatively from about 0.5 mm to about 10 mm, or alternatively from about 1 mm to about 5 mm. In an embodiment, the spacing between the spacers is about 3 mm. As will be appreciated by one of skill in the art, and with the help of this disclosure, the spacing between the spacers is dependent on the type and amount of support required by the electrodes used in a particular battery, and it may depend on a variety of factors, such as for example the type and number of electrodes used, the area of the electrodes used, the electrode area covered or masked by the spacers, etc. Further, as will be appreciated by one of skill in the art, and with the help of this disclosure, if an electrode area covered by a spacer is too large, this may in turn affect the performance of the electrode by impeding electrolyte access to the electrode, reducing the charge/discharge efficiency of the electrode, etc. If the spacers are too thick and/or if the spacing between the spacers is too large, the electrode material may not be properly supported, and the electrode may warp between the spacers as the battery cycles. In some embodiments, it was observed that the cathode undergoes a volume expansion on charge and a volume contraction on discharge. In an embodiment, the thickness of the spacer is what provides the spacing between the opposing electrodes and such thickness could be larger or smaller as found practical or necessary to prevent shorting between the opposing electrodes.

Further, referring to the embodiment of FIG. 8, the electrode stack 220 may be integrated 225 with a funnel 270 located below the electrode stack 220, wherein the funnel 270 may have a dual function, e.g., support the electrode stack 220 within the battery housing 210 and direct electrolyte solution 230 flow. The funnel 270 is located on a wet side of the flow-assisted battery, e.g., within the battery housing 210. The funnel 270 may further comprise a funnel neck 275 wherein at least a portion of an impeller 260 is located. In an embodiment, the funnel 270 may channel the electrolyte solution 230 flow towards the impeller 260 and may restrict the electrolyte solution 230 flow in such a manner that the flow in all flow channels 228 has about the same velocity, e.g., the electrolyte solution 230 flow in all flow channels 228 may be substantially uniform or even. In an embodiment, the velocity of the electrolyte solution 230 may be different in some flow channels when compared to other flow channels, i.e., the electrolyte solution 230 flow in the flow channels 228 may be non-uniform.

Further, referring to the embodiment of FIG. 8, the impeller 260 may be connected to a shaft 250, wherein the shaft 250 may comprise one or more interior magnets 251. A polarity of the interior magnet 251 of the shaft 250 is shown in FIG. 8 (e.g., S represents a South pole of the magnet, and N represents a North pole of the magnet). A motor 240 can be located at a bottom side (e.g., a dry side) of the flow-assisted battery, and may be enclosed for protection in a removable motor casing 245. The motor 240 may comprise an electrical connection 246 integrated within the motor casing 245. The motor casing 245 and the motor 240 may both be removable, which may aide in maintenance and/or replacement. Also, since the motor 240 is located on a dry side of the flow-assisted battery, a seal between the battery housing 210 and the removable motor casing 245 may not be needed. In an embodiment, the motor 240 comprises two exterior magnets 244 attached on a top of a rotor 241, wherein the exterior magnets 244 are held in a magnet holder 243. In an embodiment, the magnet holder 243 comprises steel, and as such it helps channel a magnetic field. A polarity of the exterior magnets 244 of the motor 240 is shown in FIG. 8 (e.g., S represents a South pole of the magnet, and N represents a North pole of the magnet). In an embodiment, the rotor 241 may rotate according to an arrow 242, wherein the rotor 241 rotates the exterior magnets 244, thereby producing a magnetic field which in turn rotates the interior magnets 251 of the shaft 250, and consequently rotates the impeller 260 according to arrow 261. The rotation of the impeller 260 may result in the movement or flow of the electrolyte solution 230 within the battery housing 210. Magnetic field lines 290 are displayed in FIG. 8, showing the magnetic coupling between the powering device on the dry side of the battery housing 210 (e.g., outside the battery housing 210, wherein the motor 240 is located) and the impeller assembly on the wet side of the battery housing 210 (e.g., inside the battery housing 210, wherein the impeller 260 and the electrode stack 220 are located).

Referring to the embodiment of FIG. 9A, a schematic representation of an embodiment of an impeller assembly 2001 of an MDEF is shown. The impeller assembly 2001 is shown integrated with a funnel 370, where the impeller assembly 2001 may be used in a flow-assisted battery. In an embodiment, the impeller assembly 2001 may comprise a shaft 350 and an impeller 360. At least a portion of the impeller 360 may be located/positioned in at least a portion of a funnel neck 375. In such embodiment, the impeller 360 may provide fluid flow of electrolyte solution within a battery housing when the impeller 360 is rotating. The funnel neck 375 represents the narrow portion of the funnel 370, e.g., the bottom part of the funnel 370 which may be shaped as a cylinder. The funnel used in a flow-assisted battery may serves multiple functions, such as for example housing the impeller assembly and holding it in place; providing a cylindrical passage (e.g., a funnel neck) in which at least a portion of the impeller may be located so that the impeller 360 may produce fluid flow; and producing pressure and/or fluid flow conditions to allow the flow velocity or flux through all of the flow channels in the electrode stack to be approximately the same. At least a portion of a bottom of the electrode stack may engage the funnel so that electrolyte flow may be directed past the impeller and may enter or exit from a top of the electrode stack or the funnel neck which houses the impeller. In some embodiments, the bottom of the electrode stack (e.g., a bottom perimeter) may be sealed to the funnel to direct the fluid flow, but a perfect seal is not necessarily needed in all embodiments.

Further, referring to the embodiment of FIG. 9A, the impeller 360 may be secured on one side (e.g., a side furthest from a powering device) by an upper thrust bearing 361 and/or a threaded lock nut 362. The impeller 360 used may experience forces from the electrolyte solution during operation. For example, as it rotates, the impeller may experience a reaction force from driving the fluid that may bias the impeller away from an external magnetic field source, which could result in decoupling of the impeller from the external magnetic field. In an embodiment, the magnetic field may produce an opposing force to prevent the impeller from decoupling (e.g., lifting off). In an alternative embodiment, a physical stop or guard, such as for example an upper thrust bearing 361 and/or a threaded lock nut 362, may be implemented in order to prevent the impeller 360 from decoupling.

In the embodiment of FIG. 9A, the impeller assembly 2001 comprises a sleeve bearing 351 located adjacent the impeller 360, on a side closest to the powering device, wherein the sleeve bearing 351 comprises an encased ring magnet (e.g., an interior magnet). At least a portion of the shaft 350 may be positioned inside at least a portion of the sleeve bearing 351. The shaft 350 is inserted through a lower thrust bearing 352, which rests on a mounting base 353. In an embodiment, the upper thrust bearing 361, the sleeve bearing 351, and/or the lower thrust bearing 352 may comprise a polymer or other chemically resistant material coating. The coating may serve to protect the magnets or other metallic components from reacting with the electrolyte solution. Any suitable polymer or chemically resistant material that is chemically inert or resistant to the components of the electrolyte may be used. Suitable coating materials can include, but are not limited to, PTFE, TEFLON, DELRIN, noryl resin, a ceramic material, etc. DELRIN is an acetal resin commercially available from DuPont. Noryl resin is a blend of polyphenylene oxide and polystyrene, and is commercially available from SABIC. In an embodiment, the shaft 350 comprises a metal and/or a ceramic material.

Further, referring to the embodiment of FIG. 9A, the impeller 360 may rotate in the direction indicated by arrow 354. In such embodiment, an electrolyte solution may flow downward into the funnel 370 and through the funnel neck 375 as indicated by the electrolyte solution flow arrows 331. As will be appreciated by one of skill in the art, and with the help of this disclosure, the impeller 360 may be configured such that it rotates in the opposite direction compared to the arrow 354, causing the electrolyte solution to flow in an upward direction through the funnel neck 375 and the funnel 370 (as opposed to the direction of the electrolyte solution flow arrows shown in FIG. 9A).

Figure 9B:
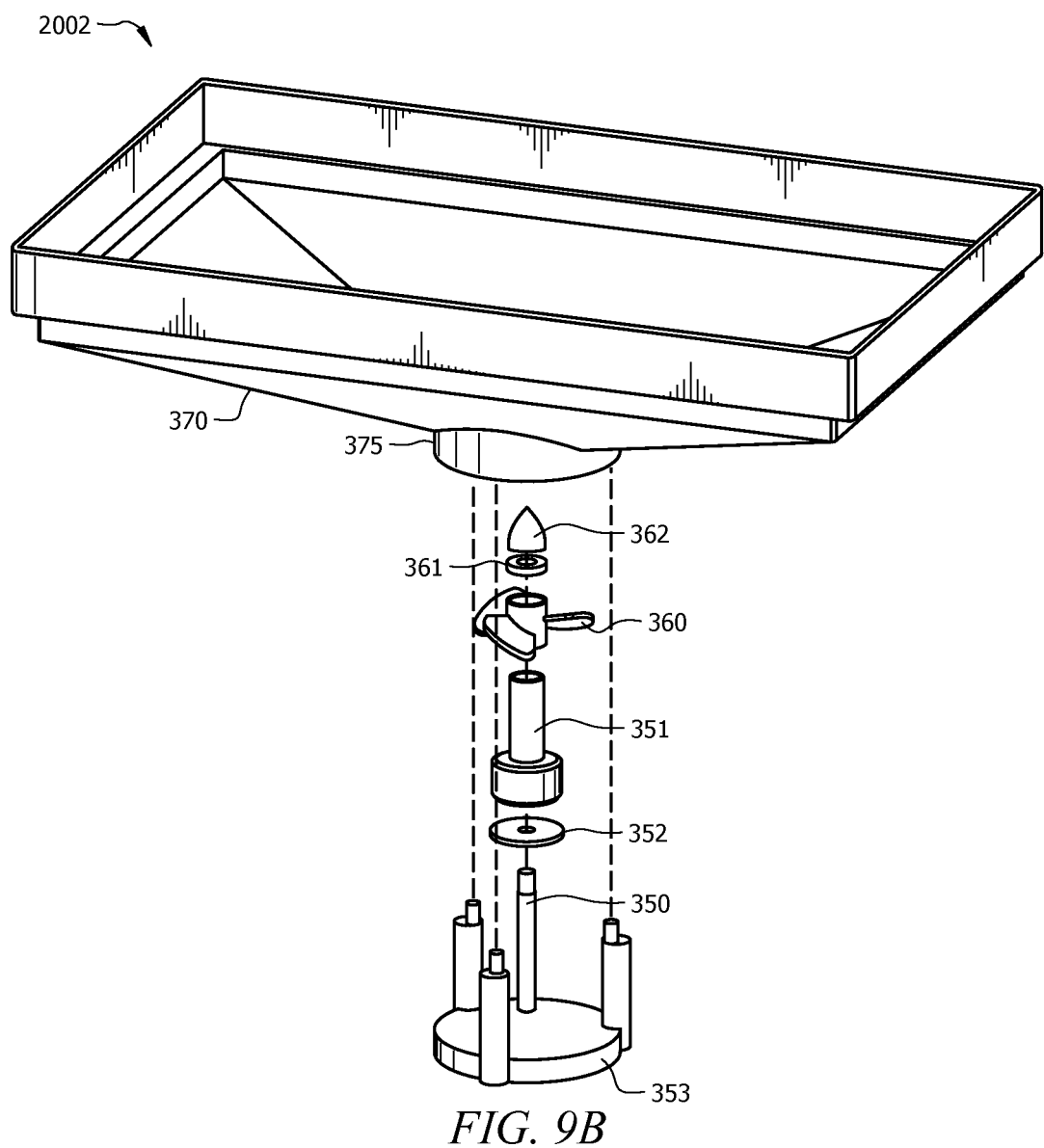
FIG. 9B displays a schematic representation of an exploded view of an embodiment of an impeller assembly of an MDEF.

Referring to the embodiment of FIG. 9B, an exploded view of an impeller assembly 2002 (e.g., an exploded view of the impeller assembly 2001 of FIG. 9A) of an MDEF is shown. The impeller assembly 2002 is shown integrated with a funnel 370, wherein the impeller assembly 2002 may be used in a flow-assisted battery. The impeller assembly 2002 comprises a funnel 370 further comprising a funnel neck 375; an upper thrust bearing 361; a threaded lock nut 362; an impeller 360; a sleeve bearing 351; a lower thrust bearing 352; a shaft 350; and a mounting base 353, wherein all these components of the impeller assembly 2002 have been described with respect to FIG. 9A.

Figure 10A:
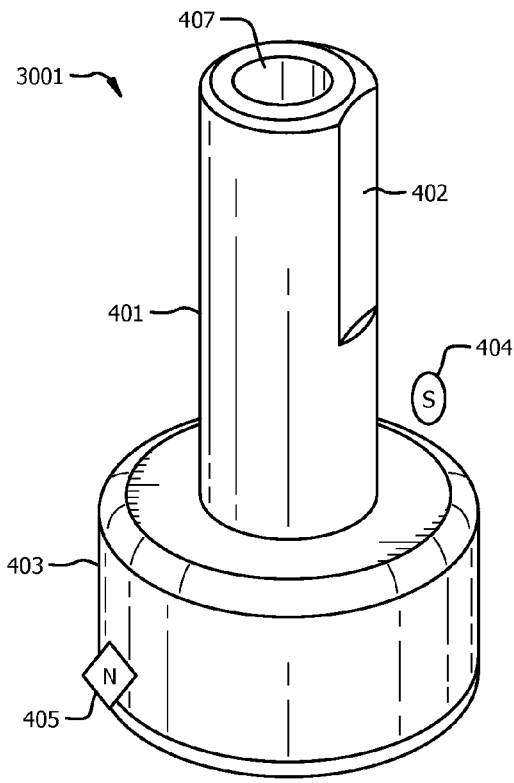
FIG. 10A displays an isometric view of an embodiment of a sleeve bearing.
Figure 10B:
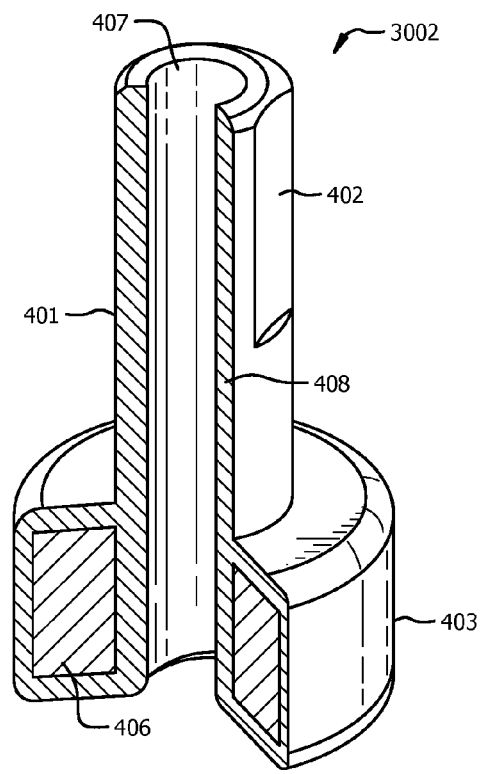
FIG. 10B displays a cutaway view of an embodiment of a sleeve bearing.

Referring to the embodiment of FIG. 10A, an isometric view of a sleeve bearing 3001 (e.g., a sleeve bearing 351 as shown in FIGS. 9A and/or 9B) is shown. Referring to the embodiment of FIG. 10B, a cutaway view of a sleeve bearing 3002 (e.g., a sleeve bearing 351 as shown in FIGS. 9A and/or 9B) is shown. The sleeve bearing 3001 and/or the sleeve bearing 3002 may have an approximately uniform inner diameter. The sleeve bearing 3001 and/or the sleeve bearing 3002 may comprise an inner surface 407, wherein the inner surface 407 may act as a sleeve bearing against a shaft (e.g., as shown in FIGS. 9A and/or 9B), thereby desirably reducing friction associated with the shaft (e.g., shaft movement/rotation). The sleeve bearing 3001 and/or the sleeve bearing 3002 may comprise two sections, wherein both sections have about the same inner diameter, wherein an upper section 401 has a smaller outer diameter than a lower section 403, as seen in FIGS. 10A and 10B. The upper section 401 may comprise a keyed surface 402, wherein the keyed surface 402 may help in mounting an impeller in a desired position (e.g., as shown in FIGS. 9A and/or 9B) and maintaining the impeller in the desired position during rotation. A body 408 of the sleeve bearing 3001 and/or the sleeve bearing 3002 may comprise a chemical resistant polymer, a polymer, PTFE, TEFLON, DELRIN, noryl resin, and the like, or combinations thereof.

The lower section 403 of the sleeve bearing 3001 and/or the sleeve bearing 3002 may comprise a ring magnet 406 (e.g., an interior magnet), a plurality of individual magnets, or any combination thereof. The polarity of the magnet 406 is shown in FIG. 10A: a South pole 404 of the ring magnet 406, and North pole 405 of the ring magnet 406. In an embodiment, the ring magnet 406 is diametrically magnetized. The ring magnet 406 may be encased in the same material that forms the body 408 of the sleeve bearing 3001 and/or the sleeve bearing 3002, thereby protecting the ring magnet 406 from the electrolyte solution. As will be appreciated by one of skill in the art, and with the help of this disclosure, neodymium magnets may be damaged/corroded by electrolyte solutions, such as for example potassium hydroxide solutions. Further, as will be appreciated by one of skill in the art, and with the help of this disclosure, the sleeve bearing 3001 and/or the sleeve bearing 3002 does not require a ring magnet, and the ring magnet may be replaced by one or more magnets arranged such that an alternating or changing exterior magnetic field will impart a rotating motion to an impeller assembly.

In an embodiment, at least a portion of an outer surface of an interior magnet (e.g., an interior magnet of an impeller assembly, such as for example a ring magnet) may be coated with a chemical resistant coating, a polymer, PTFE, TEFLON, DELRIN, noryl resin, and the like, or combinations thereof.

In an embodiment, the impeller of the MDEF may comprise any suitable device for stirring a liquid, such as for example a propeller, a stirring element, a liquid stirrer, an elliptical stirrer, a stir bar, a magnetic stir bar, and the like, or combinations thereof. In an embodiment, at least a portion of an outer surface of the impeller may be coated with a chemical resistant coating, such as for example a polymer, PTFE, TEFLON, DELRIN, noryl resin, and the like, or combinations thereof.

In an embodiment, the impeller comprises a propeller. Generally, a propeller is a type of fan that comprises two or more blades (e.g., three blades, four blades, five blades, six blades, or more), which converts a rotational motion within a fluid into thrust. When a propeller rotates, a pressure difference is produced between forward and rear surfaces of the blade, and a liquid (e.g., an electrolyte solution) may be accelerated behind the blade. Generally, a propeller that turns in a first direction may produce a forward thrust, i.e., moves a liquid (e.g., an electrolyte solution) away from the blades, and a propeller that turns in a second direction that is opposite of the first direction may produce a backward thrust, i.e., moves a liquid (e.g., an electrolyte solution) toward the blades. In an embodiment, the blades of the propeller may be characterized by a pitch, wherein the pitch of a blade refers to an angle of the blade with respect to a plane of rotation of the blade. In an embodiment, the impeller comprises a propeller with three blades, wherein the blades have a pitch of about 45 degrees. Other designs and configurations of impellers suitable for use in the present disclosure will be appreciated by one of skill in the art, and with the help of this disclosure.

In an embodiment, the funnel of the impeller assembly of the MDEF may assist in producing an approximately equivalent flow (e.g., even flow) in the flow channels of the electrode stack. However, a funnel is not required for an MDEF, and any other suitable methods and/or configurations of an impeller assembly of the MDEF may be used. In an alternative embodiment, the impeller assembly may comprise a bilge wall that houses at least a portion of the impeller, as it can be seen in FIG. 11.

Figure 11:
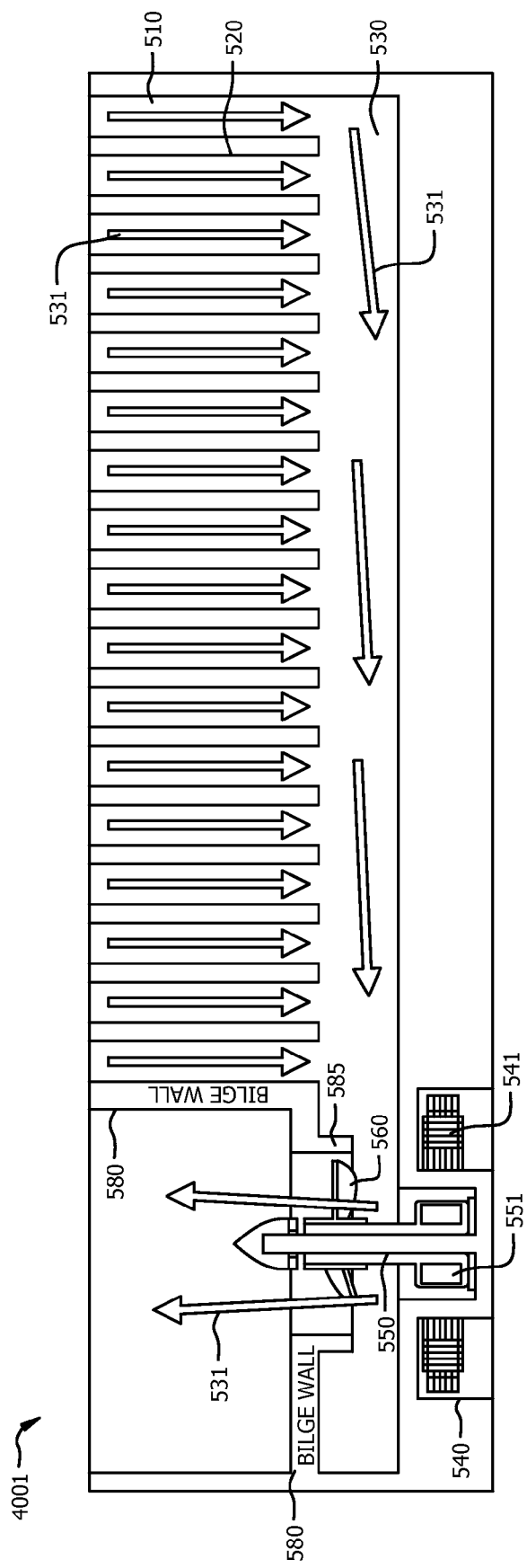
FIG. 11 displays a cross-section schematic of an embodiment of an MDEF comprising a bilge wall.

Referring to the embodiment of FIG. 11, an MDEF 4001 is shown integrated with a flow-assisted battery. The flow-assisted battery comprises a battery housing 510, an electrode stack 520 and an electrolyte solution 530, wherein the electrode stack 520 and the electrolyte solution 530 are supported within the battery housing 510. A magnetic powering device 540 may be coupled onto an outer surface of the battery housing 510, such as for example on a surface located at a bottom part of the battery housing 510, e.g., on a dry side of the battery housing 510. An impeller assembly may be supported within the battery housing 510, e.g., on a wet side of the battery housing 510. The impeller assembly may comprise a shaft 550, one or more interior magnets 551, an impeller 560, and a bilge wall 580, wherein at least a portion of the impeller 560 may be located in an impeller case 585, and wherein the impeller case 585 may be part of (e.g., and extension of) the bilge wall 580, as seen in FIG. 11. Without wishing to be limited by theory, the bilge wall performs the same function(s) as the funnel. In particular, the bilge wall 580 serves to channel the fluid along a desired flow path. The impeller assembly may create a low pressure zone below the electrode stack 520 and thereby provide approximately even flow through the channels.

Further, referring to the embodiment of FIG. 11, the powering device 540 may comprise a stator coil 541, wherein the stator coil 541 may create a magnetic field, which in turn rotates the interior magnet 551, thereby causing the impeller 560 to rotate and cause the electrolyte solution 530 to flow according to the electrolyte solution flow arrows 531.

In an embodiment, the MDEF may comprise a powering device, wherein the powering device may produce an external magnetic field (e.g., a magnetic field originating outside the battery housing) to operate a flow-assisted battery (e.g., a flow-assisted secondary nickel-zinc battery). An external rotating magnetic field (and magnetic coupling to an interior magnet located on a wet side of the flow-assisted battery) may be created by using a BLDC motor to rotate one or more interior magnets (e.g., two interior magnets) located on the wet side of the flow-assisted battery. Magnetic coupling of the interior magnet located on the wet side of the flow-assisted battery (e.g., a magnet attached to the impeller via a shaft and/or a sleeve bearing) to the exterior magnet or magnets located on the dry side of the flow-assisted battery (e.g., a magnet or magnets attached to or part of the BLDC motor) may cause the impeller to rotate when the exterior magnets located on the dry side of the flow-assisted battery rotate.

In an alternative embodiment, electromagnets found in AC and/or DC electric motors may be used to create a magnetic field that may impart a rotational motion to the impeller supported inside the battery housing. In such embodiment, the electromagnets may comprise copper coils with a laminated core that produce and concentrate a magnetic field when an electrical current is passed through the coils. Such resulting magnetic field can be used, much in the same way as it is used in many AC or DC motors, to impart a circular motion or rotation to the interior magnet or magnets located on the wet side of the flow-assisted battery.

Figure 12:
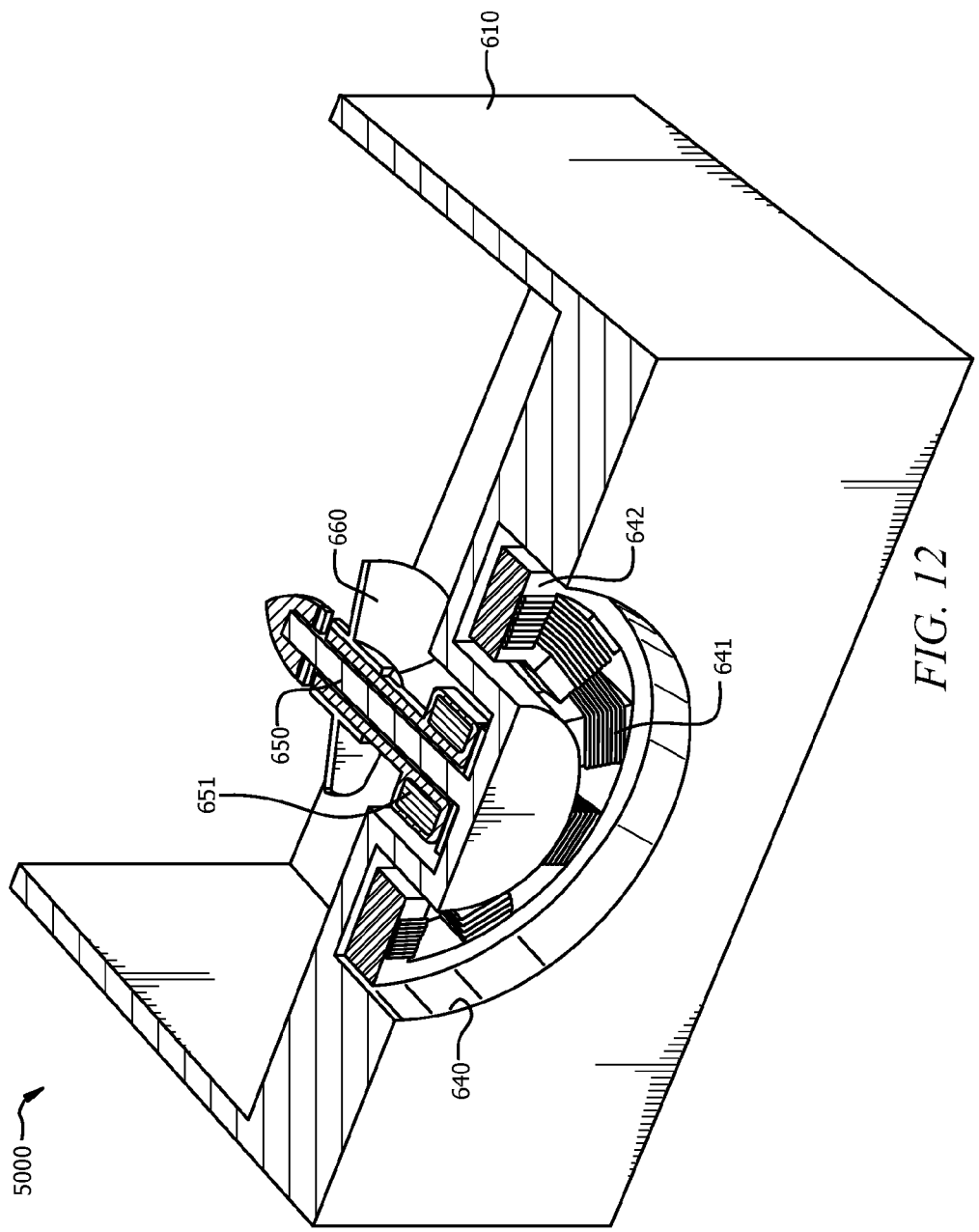
FIG. 12 displays a schematic of an embodiment of a stator of a brushless DC (BLDC) motor or an electromagnetic stator of an MDEF.

FIG. 12 shows an embodiment of a BLDC stator or "electromagnetic stator" used to generate a magnetic field which influences the magnet inside the battery and consequently rotates the impeller to which it is attached. Referring to the embodiment of FIG. 12, a schematic of an MDEF 5000 comprising a powering device 640 is shown, wherein the powering device comprises electromagnets. The powering device 640 is located outside a battery housing 610, e.g., on a dry side of the battery housing 610. The powering device 640 comprises a stator coil 641 comprising a series of copper coils wound around a stator core 642, wherein the stator core 642 comprises a series of metal laminated layers. An external or additional drive circuit may control a current that may be supplied to the stator coil 641 (e.g., copper coil). Without wishing to be limited by theory, when a current is supplied to a coil (e.g., a stator coil, a metal coil, a copper coil, etc.), a magnetic field is produced. Such magnetic field may be concentrated through the metal laminated layers of the stator core 642. The magnetic field may act on an interior magnet 651 located on a wet side of the battery housing 610, wherein the interior magnet 651 may be part of the shaft and/or sleeve bearing 650. The interior magnet 651 may rotate under the influence of the magnetic field, thereby imparting a rotational motion to an impeller 660. In an embodiment, the drive circuit may alternate current to successive stator coils 641 in order to produce rotation of the interior magnet 651, and consequently to produce rotation of the impeller 660. Current may be started and stopped through individual stator coils 641 to produce a changing magnetic field that would impart rotation to the interior magnet 651, and consequently to the impeller 660 supported within the battery housing 610. Other methods and configurations for producing magnetic fields suitable for use in the present disclosure will be apparent to one of skill in the art, and with the help of this disclosure.

In an embodiment, an interior magnet used as part of the propeller assembly on a wet side of a battery housing may exert a downward force due to magnetic coupling to the magnetic field created by the powering device located on a dry side of the battery housing. A lower thrust bearing (e.g., a lower thrust bearing such as lower thrust bearing 352 described in FIGS. 9A and 9B) may be used to reduce or limit wear on the housing from the coupling force. In some embodiments, the force may be reduced by aligning the magnetic fields of the internal magnets and the external magnets.

Figure 13B:
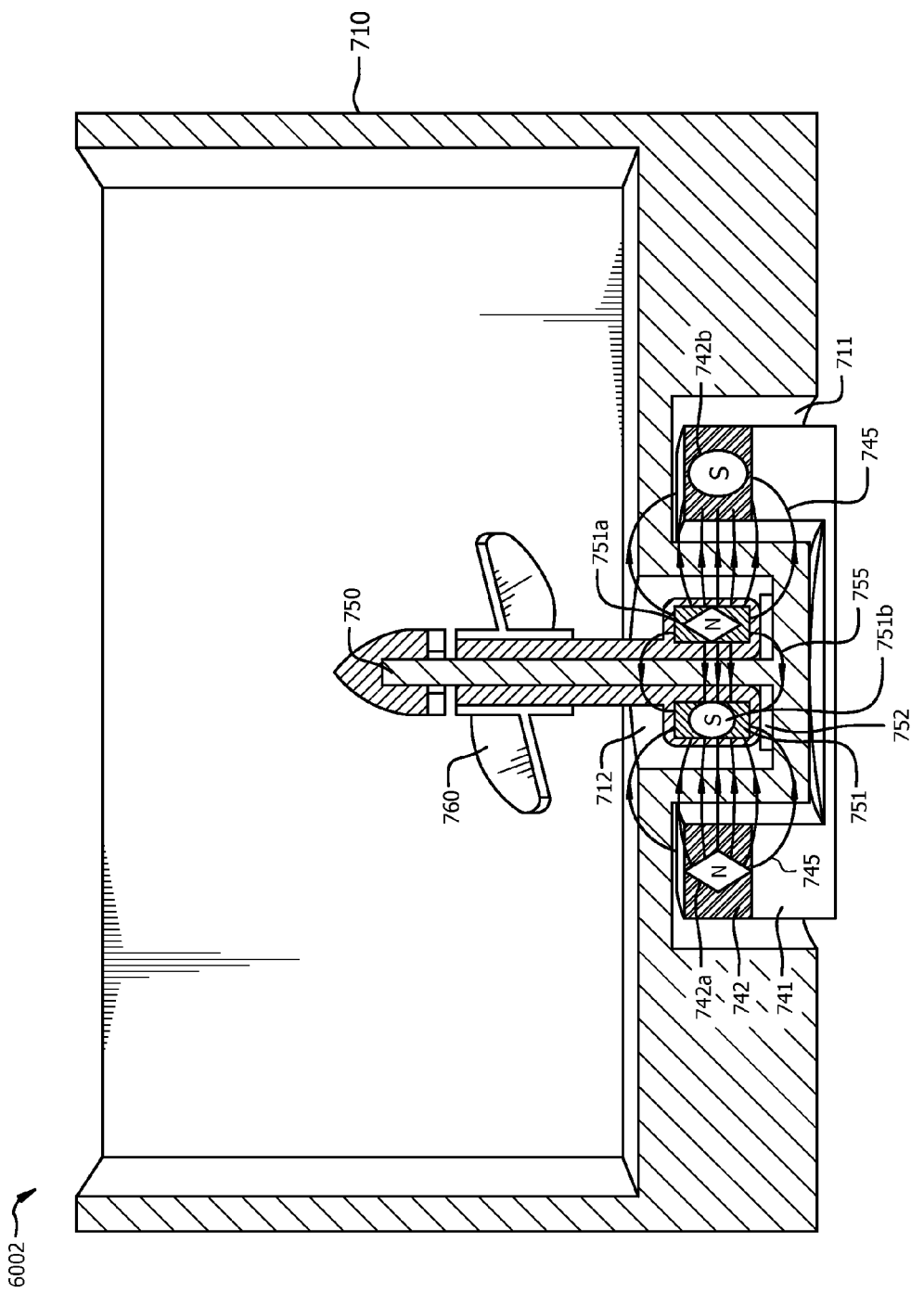
FIG. 13B displays a schematic of an embodiment of magnets for magnet coupling in a powering device of an MDEF.

Referring to the embodiment of FIG. 13A, an embodiment of an MDEF 6001 comprising a powering device comprising a ring magnet 742 (e.g., an exterior magnet) is shown. Referring to the embodiment of FIG. 13B, an embodiment of an MDEF 6002 comprising a powering device comprising a ring magnet 742 (e.g., an exterior magnet) is shown. When the interior magnets are radially aligned with the exterior magnets, the downward force exerted by an interior magnet 751 on the housing may be reduced. The battery housing 710 may be molded and/or shaped with an inner compartment 712 and an outer compartment 711, wherein the inner compartment 712 comprises an interior magnet 751 (e.g., a ring magnet) and the outer compartment 711 comprises the ring magnet 742, as shown in the embodiments of FIGS. 13A and/or 13B. The ring magnet 742 may be supported on a rotating platform 741. The interior magnet 751 may be encased in a sleeve bearing positioned on a shaft 750, wherein the shaft 750 and/or the sleeve bearing may be coupled to an impeller 760, and wherein the sleeve bearing comprising the interior magnet 751 may rest on a lower thrust bearing 752. It can be seen that the radial alignment of the magnets may reduce the downward force on the lower thrust bearing 752 relative to an alignment in which the exterior magnets are axially aligned with the interior magnets, thereby positing in the lower thrust bearing between the interior and exterior magnets. As used herein, axially aligned refers to an alignment along the longitudinal axis of the shaft 750, and radially aligned refers to an alignment perpendicular to the axis of the shaft 750 (i.e., in the radial direction relative to the main axis of shaft 750)

Referring to the embodiments of FIGS. 13A and/or 13B, the ring magnet 742 and the interior magnet 751 may be aligned along a horizontal axis, thereby aligning a magnetic field horizontally and reducing a downward force exerted by the interior magnet 751 onto the lower thrust bearing 752, and consequently on the battery housing 710. Similarly, an upward force exerted by the ring magnet 742 may also be reduced by aligning the ring magnet 742 and the interior magnet 751 along a horizontal axis, thereby reducing a force and wear exerted by the ring magnet 742 on the battery housing 710. Magnetic field lines 745 are displayed in FIG. 13B, showing a horizontal magnetic coupling between the ring magnet 742 and the interior magnet 751. Magnetic field lines 755 are also displayed in FIG. 13B, showing a magnetic coupling within the ring structure of the interior magnet 751. A polarity of the interior magnet 751 is shown in FIG. 13B: a South pole 751b of the interior magnet 751, and North pole 751a of the interior magnet 751 (e.g., S represents a South pole of a magnet, and N represents a North pole of a magnet). Further, a polarity of the ring magnet 742 is shown in FIG. 13B: a South pole 742b of the ring magnet 742, and North pole 742a of the ring magnet 742.

As seen in the embodiment of FIG. 13B, a shape of the magnetic field may be controlled by shaping the battery housing 710 with compartments (e.g., inner compartment 712, outer compartment 711), wherein magnets may be positioned and/or aligned in such compartments. While the embodiment of FIG. 13B shows the compartments of the battery housing 710 positioned on a bottom side of the battery housing 710, as will be appreciated by one of skill in the art, and with the help of this disclosure, such compartments may be created and used on any side of the battery housing, such as for example a top of the battery housing, a side of the battery housing, etc.

In an embodiment, other components, such as for example laminated iron cores, may be used to shape and concentrate magnetic fields in a way that improves the performance of external driving magnetic fields and/or a motion of an impeller assembly. In an embodiment, laminated iron cores may be used as part of a powering device of an MDEF of a flow-assisted battery (e.g., a flow-assisted secondary nickel-zinc battery, such as for example a 140 Ah flow-assisted secondary nickel-zinc battery) to shape a magnetic field and/or to reduce a downward force that may be exerted on an interior magnet for example, thereby reducing the wear on a lower thrust bearing and/or a battery housing, and consequently increasing the life of the battery.

In an embodiment, the MDEFs and methods of using the same disclosed herein may advantageously display improved stability, performance, and/or other desired attributes or characteristics. Generally, conventional flow batteries include an auxiliary tank that holds a portion of the electrolyte solution for the flow battery, and such auxiliary tank may be connected to a battery housing by tubes, which may leak over time and degrade or deteriorate the performance of such battery system. The MDEFs advantageously reduce and/or completely eliminate the need for an auxiliary electrolyte solution tank and for tubes and tube fittings or connections through the battery housing.

In an embodiment, the powering device of the MDEF disclosed herein is advantageously completely isolated from the electrolyte solution. The powering device of the MDEF may be completely isolated from a corrosive environment within the battery. The powering device of the MDEF may not require holes, seals, or porting into a battery housing of the flow-assisted battery.

In an embodiment, the MDEF disclosed herein may advantageously provide a means for mixing an electrolyte solution in a flow-assisted battery (e.g., a flow-assisted secondary nickel-zinc battery) in a simple (e.g., reduced complexity), safe (e.g., elimination of electrolyte solution spilling risk) and cost-effective manner, wherein the cost-effectivity may refer to a reduction in power used to provide the mixing of the electrolyte solution, in part due to eliminating friction of flowing electrolyte solution through tubings; and to a reduction in total materials cost by integrating an impeller assembly with an electrode stack within a battery housing. In an embodiment, the MDEF disclosed herein may advantageously provide for improved performance, efficiency, and cycle life for flow-assisted batteries. The use of an MDEF with a flow-assisted battery may advantageously lead to a reduced volume and weight of the battery.

In an embodiment, the MDEF disclosed herein may advantageously allow an impeller to rotate and mix an electrolyte solution within a battery housing of a flow-assisted battery, thereby improving the performance of the flow-assisted battery. The MDEF may advantageously reduce and/or completely eliminate a need to seal into the flow-assisted battery in order to produce a flow of electrolyte solution.

In an embodiment, the MDEF disclosed herein may advantageously apply a magnetic field produced outside a battery housing to impart a rotational motion to an impeller assembly located within the battery housing. In an embodiment, the MDEF may comprise a fixed or permanent magnet for creating a magnetic field outside a battery housing. As will be appreciated by one of skill in the art, and with the help of this disclosure, the magnetic field produced outside a battery housing may impart motion to any other suitable elements within a battery housing, such as for example an electrolyte. Generally, electrolytes and/or electrolyte systems contain charged species or ions that carry an effective charge. For example, when potassium hydroxide is added to water $K+$ and $OH-$ ions are formed and these ions carry opposite charges. Without wishing to be limited by theory, a magnetic field can exert a force on a moving a charged particle. In some embodiments, it might be possible to use a magnetic field to influence charged ions in the electrolyte and produce electrolyte flow, if not only agitation of the electrolyte. This concept is similar to an electromagnetic pump, only applied to agitate or flow the electrolyte within the battery.

In an embodiment, the MDEF disclosed herein may advantageously comprise a powering device that is removable, thereby facilitating the maintenance on the powering device and/or replacing the powering device without having to open a battery housing of a flow-assisted battery.

In an embodiment, the MDEF disclosed herein may advantageously comprise a powering device that may be electrically powered by an external source, by the battery itself (e.g., flow-assisted battery), or by a series of batteries (e.g., as occurs when batteries are placed in series strings to produce higher voltages). Additional advantages of the MDEF disclosed herein and methods of using same may be apparent to one of skill in the art viewing this disclosure.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The properties of an MDEF and/or components thereof were investigated. More specifically, the flow properties of an electrolyte solution within the flow channels of a flow-assisted battery integrated with an MDEF were investigated.

A flow-assisted battery was assembled as described in FIG. 8, with the exception that the electrodes were replaced with optically transparent acrylic sheets in the electrode stack. The optically transparent acrylic sheets were the same dimensions as the electrodes that they replaced in the electrode stack. A transparent acrylic material was used so that the flow in each flow channel of the electrode stack could be studied.

Figure 14:
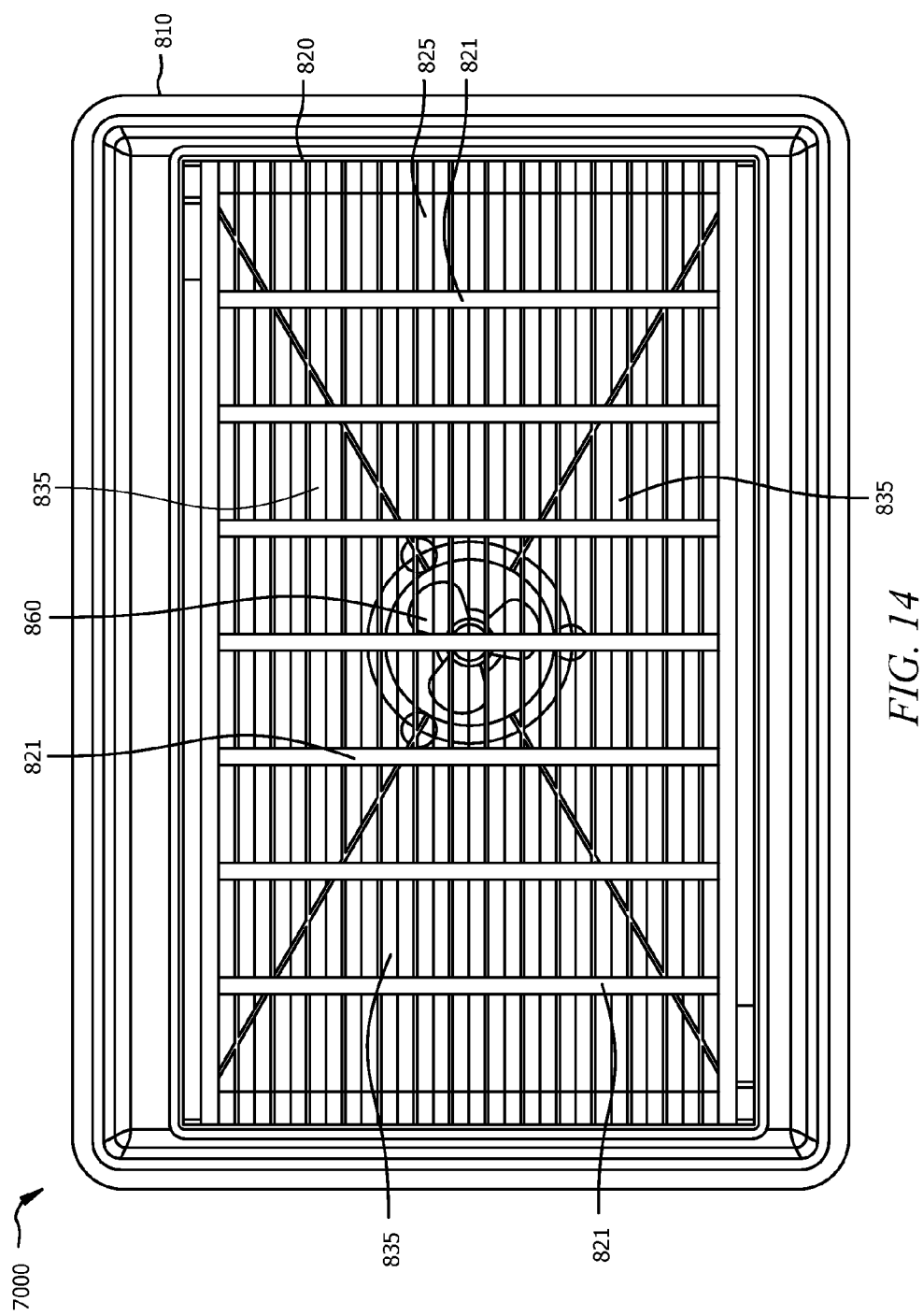
FIG. 14 displays a top view of an electrode stack structure of an MDEF in an exemplary embodiment.

A top view of an MDEF testing assembly 7000 is shown in FIG. 14. A battery housing 810 was assembled to support a testing electrode stack 820 comprising optically transparent acrylic sheets 825 that were separated by spacers 821. The testing electrode stack 820 comprised a total of 28 optically transparent acrylic sheets 825 replacing electrodes, and there were a total of 8 flow channels 835 across each optically transparent acrylic sheet 825. The MDEF testing assembly 7000 had 224 flow channels 835, and all these flow channels are visible in FIG. 14. FIG. 12 also shows the position of the propeller 860 within the MDEF testing assembly 7000.

Sub-millimeter sized fluorescent wax particles having a similar density to the potassium hydroxide electrolyte used in a flow-assisted secondary nickel-zinc battery were produced and added to the electrolyte solution. These fluorescent wax particles would fluoresce when a green laser was shined on them and allowed for the particles to be traced as they traveled through the flow channels 835 of the testing electrode stack 820.

Particle tracing was performed in every one of the 224 channels for 2 different propeller speeds. The propeller speeds were measured using a digital tachometer. The summary data for the experiment is shown below in Table 1 as well as in FIG. 15.

TABLE 1

| Propeller Speed [RPM] | Average Channel Flow [cm/s] | Standard Deviation |
|---|---|---|
| 700 | 1.526438647 | 0.1036 |
| 1200 | 0.789234169 | 0.0586 |

Figure 15:
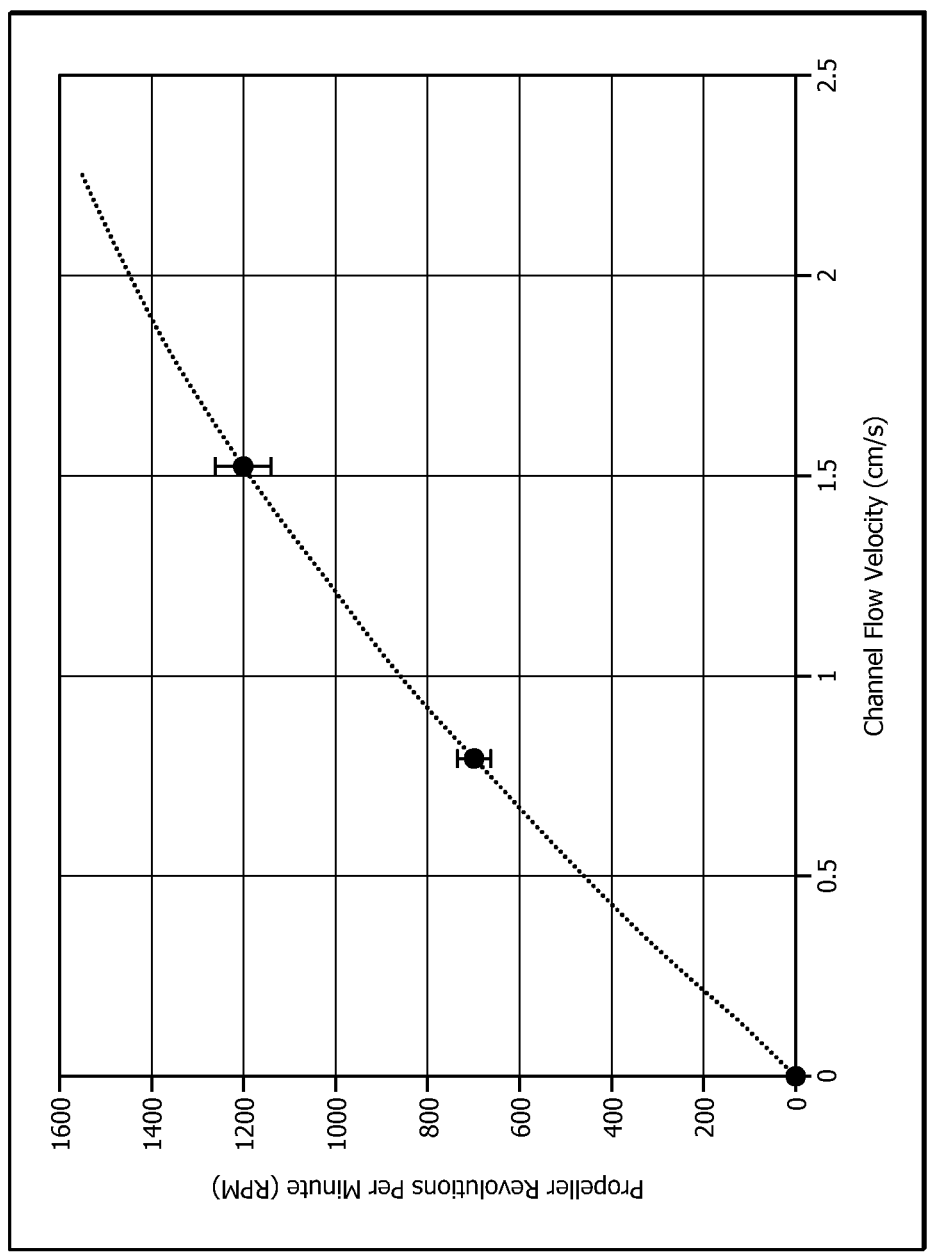
FIG. 15 displays a graph showing propeller revolutions per minute as a function of channel flow velocity for an MDEF in an exemplary embodiment.

The data in FIG. 15 and Table 1 indicates that the velocity of a fluid in a flow channel may be controlled by controlling the speed of the propeller.

Additional Disclosure

The following are nonlimiting, specific embodiments in accordance with the present disclosure:

In a first embodiment, a device for producing electrolyte flow in a flow-assisted battery comprises a flow assisted battery, a powering device located on a dry side of a battery housing, and an impeller assembly located on a wet side of the battery housing. The flow assisted battery comprises a battery housing, an anode, a cathode and an electrolyte solution, where the anode, the cathode and the electrolyte solution are disposed within the battery housing. The impeller assembly comprises: a shaft, an impeller, and one or more interior magnets, and the powering device and the impeller assembly are magnetically coupled through the battery housing.

A second embodiment may include the device of the first embodiment, wherein the powering device may generate a rotating magnetic field.

A third embodiment may include the device of the first embodiment, wherein the powering device may comprise one or more exterior magnets, and the interior magnets and the exterior magnets may be magnetically coupled.

A second embodiment may include the device of the third embodiment, wherein the interior magnets and the exterior magnets may be radially aligned.

A fifth embodiment may include the device of the first embodiment, wherein the powering device may comprise one or more electromagnets, and the interior magnets and the electromagnets may be magnetically coupled.

A sixth embodiment may include the device of any of the first to fifth embodiments, wherein the impeller assembly may comprise a centrifugal impeller.

A second embodiment may include the device of any of the first to fifth embodiments, wherein the impeller may comprise a device for stirring a liquid, a propeller, a stirring element, a liquid stirrer, an elliptical stirrer, a stir bar, a magnetic stir bar, or any combination thereof.

An eighth embodiment may include the device of the seventh embodiment, wherein the blades may have a pitch of about 45 degrees.

A ninth embodiment may include the device of any of the first to eighth embodiments, wherein at least a portion of an outer surface of at least one of the impeller, the shaft, or the one or more interior magnets may be coated with a chemical resistant coating, a polymer, polytetrafluoroethylene, TEFLON, DELRIN, noryl resin, or any combination thereof.

A tenth embodiment may include the device of any of the first to ninth embodiments, wherein the powering device may comprise a magnetic drive, an electronic speed controller, a polyphase AC electrical power system, a two-phase AC electrical power system, a three-phase AC electrical power system, a motor, a brushless DC motor, an AC electric motor, or a DC electric motor.

An eleventh embodiment may include the device of any of the first to tenth embodiments, wherein the powering device may be removably coupled to the battery housing.

A twelfth embodiment may include the device of any of the first to eleventh embodiments, wherein the impeller assembly may also include a mounting base, a lower thrust bearing, a sleeve bearing, an upper thrust bearing, and a threaded lock nut; wherein the threaded lock nut and/or the upper thrust bearing prevent the impeller from decoupling; wherein at least a portion of the shaft is located inside at least a portion of the sleeve bearing; and wherein the sleeve bearing comprises the interior magnets.

A thirteenth embodiment may include the device of the twelfth embodiment, wherein the sleeve bearing may comprise a body comprising a chemical resistant coating, a polymer, polytetrafluoroethylene, TEFLON, DELRIN, noryl resin, or combinations thereof; wherein the interior magnet may comprise a ring magnet; wherein the body of the sleeve bearing encases the ring magnet, thereby protecting the ring magnet from the electrolyte solution.

A fourteenth embodiment may include the device of any of the first to thirteenth embodiments, wherein at least a portion of an outer surface of the interior magnet may be coated with a chemical resistant coating, a polymer, polytetrafluoroethylene, TEFLON, DELRIN, noryl resin, or combinations thereof.

A fifteenth embodiment may include the device of any of the first to fourteenth embodiments, wherein the flow assisted battery may comprise a flow-assisted secondary nickel-zinc battery, wherein the anode may comprise a Zn anode, and wherein the cathode may comprise a nickel oxide cathode.

A sixteenth embodiment may include the device of any of the first to fourteenth embodiments, wherein the flow assisted battery may comprise a flow-assisted secondary Zn—MnO2 battery, wherein the anode may comprise a Zn anode, and wherein the cathode may comprise a MnO2 cathode.

A seventeenth embodiment may include the device of any of the first to sixteenth embodiments, wherein the flow-assisted battery may comprise an electrode stack, wherein the electrode stack may comprise flow channels, wherein the flow-assisted battery further may comprise a bilge wall, wherein the bilge wall may house at least a portion of the impeller, thereby producing an even flow of electrolyte solution through the flow channels.

An eighteenth embodiment may include the device of any of the first to seventeenth embodiments, further comprising one or more spacers disposed between the anode and cathode, wherein the one or more spacers may be configured to maintain a fixed spacing between the anode and cathode.

A nineteenth embodiment may include the device of the eighteenth embodiment, wherein the one or more spacers may comprise a plurality of snap spacer, wherein a first snap spacer of the plurality of snap spacers may couple to the anode, wherein a second snap spacer of the plurality of snap spacers may couple to the cathode, and wherein the first snap spacer may be configured to snap to the second snap spacer and maintain the fixed spacing.

A twentieth embodiment may include the device of any of the first to nineteenth embodiments, wherein the powering device may be electrically powered by at least one of an external source, by a battery, or by a series of batteries.

A twenty first embodiment may include the device of the twentieth embodiment, wherein the battery or the series of batteries may comprise a flow-assisted battery.

In a twenty second embodiment, a device for producing electrolyte flow in a flow-assisted battery comprises a flow assisted battery, a funnel assembly in fluid communication with an electrode stack, an impeller assembly located on a wet side of a battery housing, and a powering device located on a dry side of the battery housing. The flow assisted batter comprises a battery housing, an electrode stack, and an electrolyte solution, and the electrode stack and the electrolyte solution are disposed within the battery housing. The funnel assembly is configured to direct fluid flow through the electrode stack. The impeller assembly comprises: an impeller, and one or more interior magnets, and the impeller is configured to generate a fluid flow through the funnel when the impeller is rotating. The powering device and the impeller assembly are magnetically coupled through the battery housing.

A twenty third embodiment may include the device of the twenty second embodiment, wherein the funnel may comprises a funnel neck, and wherein at least a portion of the impeller may be located inside the funnel neck.

A twenty fourth embodiment may include the device of the twenty second or twenty third embodiment, wherein the electrode stack may comprise flow channels, and wherein the funnel may support the electrode stack within the battery housing, and wherein the funnel may be configured to create a substantially even flow of electrolyte solution through the flow channels.

A twenty fifth embodiment may include the device of any of the twenty second to twenty fourth embodiments, wherein the electrode stack may comprise a plurality of anodes and a plurality of cathodes, and wherein the device may further comprise a plurality of spaces disposed between adjacent anodes and cathodes of the plurality of anodes and the plurality of cathodes.

A twenty sixth embodiment may include the device of any of the twenty second to twenty fifth embodiments, wherein the powering device may comprise one or more exterior magnets, wherein the one or more exterior magnets may be configured to magnetically couple through the housing to the one or more interior magnets.

A twenty seventh embodiment may include the device of the twenty sixth embodiment, wherein the one or more exterior magnets may be radially aligned with the one or more interior magnets.

In a twenty eighth embodiment, a method for producing energy comprises charging a flow-assisted battery to a charge voltage, discharging the flow-assisted battery to a discharge voltage to produce energy, and continuously circulating the electrolyte solution through the battery housing during the charging and the discharging by using a magnetic device for producing electrolyte flow in a flow-assisted battery. The flow-assisted battery comprises: a battery housing, a cathode, an anode, and an electrolyte solution, wherein the cathode, the anode, and the electrolyte solution are supported within the battery housing;

A twenty ninth embodiment may include the method of the twenty eight embodiment, wherein the magnetic device for producing electrolyte flow in a flow-assisted battery may comprise a powering device located on a dry side of the battery housing, and an impeller assembly located on a wet side of the battery housing. The impeller assembly may comprise a shaft, an impeller, and one or more interior magnets, and the powering device and the impeller assembly may be magnetically coupled through the battery housing.

A thirtieth embodiment may include the method of the twenty eight or twenty ninth embodiment, wherein continuously circulating the electrolyte solution may comprise rotating a component of the power device, wherein the component may be magnetically coupled to the one or more interior magnets; rotating the interior magnets in response to rotating the component; rotating the shaft and impeller in response to rotating the interior magnets, and creating fluid flow based on the rotation of the impeller.

A thirty first embodiment may include the method of any of the twenty eighth to thirtieth embodiments, wherein the flow-assisted battery may comprise an electrode stack, wherein the electrode stack may comprise a plurality of flow channels, and wherein continuously circulating the electrolyte solution may comprise substantially evenly circulating the electrolyte solution through the plurality of flow channels.

A thirty second embodiment may include the method of any of the twenty eighth to thirty first embodiments, wherein the flow-assisted battery may comprise a flow-assisted secondary nickel-zinc battery, wherein the anode may comprise a zinc anode, and wherein the cathode may comprise a nickel oxide cathode.

A thirty third embodiment may include the method of any of the twenty eighth to thirty first embodiments, wherein the flow-assisted battery may comprise a flow-assisted secondary zinc-manganese dioxide battery, wherein the anode may comprise a zinc anode, and wherein the cathode may comprise a manganese dioxide cathode.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Detailed Description of the Embodiments is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A device for producing electrolyte flow in a flow-assisted battery, the device comprising:
a flow assisted battery comprising a battery housing, an anode, a cathode and an electrolyte solution, wherein the anode, the cathode and the electrolyte solution are disposed within the battery housing;
a powering device located outside of the battery housing; and
an impeller assembly located within the battery housing, wherein the impeller assembly comprises: a shaft, an impeller, one or more interior magnets, a mounting base, a lower thrust bearing, a sleeve bearing, an upper thrust bearing, and a threaded lock nut, wherein at least a portion of the shaft is located inside at least a portion of the sleeve bearing, wherein the sleeve bearing comprises the interior magnets, and wherein the powering device and the impeller assembly are magnetically coupled through the battery housing.

2. The device of claim 1, wherein the powering device generates a rotating magnetic field.

3. The device of claim 1, wherein the powering device comprises one or more exterior magnets, wherein the interior magnets and the exterior magnets are magnetically coupled.

4. The device of claim 1, wherein the powering device comprises one or more electromagnets, wherein the interior magnets and the electromagnets are magnetically coupled.

5. The device of claim 1, wherein the impeller assembly comprises at least one of a centrifugal impeller, a device for stirring a liquid, a propeller, a stirring element, a liquid stirrer, an elliptical stirrer, a stir bar, a magnetic stir bar, or any combination thereof.

6. The device of claim 1, wherein at least a portion of an outer surface of at least one of the impeller, the shaft, or the one or more interior magnets is coated with a chemical resistant coating, a polymer, polytetrafluoroethylene, TEFLON, DELRIN, noryl resin, or any combination thereof.

7. The device of claim 1, wherein the powering device comprises a magnetic drive, an electronic speed controller, a polyphase AC electrical power system, a two-phase AC electrical power system, a three-phase AC electrical power system, a motor, a brushless DC motor, an AC electric motor, or a DC, electric motor.

8. The device of claim 1, wherein the powering device is removably coupled to the battery housing.

9. The device of chum 1, wherein the threaded lock nut and/or the upper thrust bearing prevent the impeller from decoupling.

10. The device of claim 9, wherein the sleeve bearing comprises a body comprising a chemical resistant coating, a polymer, polytetrafluoroethylene, TEFLON, DELRIN, noryl resin, or combinations thereof; wherein die interior magnet comprises a ring magnet; wherein the body of the sleeve bearing encases the ring magnet and substantially prevent contact between the ring magnet and the electrolyte solution.

11. The device of claim 1, wherein at least a portion of an outer surface of the interior magnet is coated with a chemical resistant coating, a polymer, polytetrafluoroethylene, TEFLON, DELRIN, noryl resin, or combinations thereof.

12. The device of claim 1, wherein the flow assisted battery comprises a flow-assisted secondary nickel-zinc battery, wherein the anode comprises a Zn anode, and wherein the cathode comprises a nickel oxide cathode.

13. The device of claim 1, wherein the flow assisted battery comprises a flow assisted secondary Zn—MnO2 battery, wherein the anode comprises a Zn anode, and wherein the cathode comprises a MnO2 cathode.

14. The device of claim 1, wherein the flow-assisted battery comprises an electrode stack, wherein the electrode stack comprises flow channels, wherein the flow-assisted battery further comprises a bilge wall, wherein the bilge wall houses at least a portion of the impeller.

15. The device of claim 1, further comprising one or more spacers disposed between the anode and cathode, wherein the one or more spacers are configured to maintain a fixed spacing between the anode and cathode.

16. The device of claim 15, wherein the one or more spacers comprise a plurality of snap spacer, wherein a first snap spacer of the plurality of snap spacers couples to the anode, wherein a second snap spacer of the plurality of snap spacers couples to the cathode, and wherein the first snap spacer is configured to snap to the second snap spacer and maintain the fixed spacing.

17. The device of claim 1, wherein the powering device is electrically powered by at least one of an external source, by a battery, or by a series of batteries.

18. The device of claim 17, wherein the battery or the series of batteries comprise a flow-assisted battery.

19. A device for producing electrolyte flow in a flow-assisted battery, the device comprising:
- a flow assisted battery comprising a battery housing, an electrode stack, and an electrolyte solution, wherein the electrode stack and the electrolyte solution are disposed within the battery housing;
- a funnel assembly in fluid communication with the electrode stack, wherein the funnel assembly is configured to direct fluid flow through the electrode stack;
- an impeller assembly located within the battery housing, wherein the impeller assembly comprises: an impeller, and one or more interior magnets, and wherein the impeller is configured to generate a fluid flow through the funnel when the impeller is rotating; and
- a powering device located outside of the battery housing, wherein the powering device and the impeller assembly are magnetically coupled through the battery housing.

20. The device of claim 19, wherein the funnel comprises a funnel neck, and wherein at least a portion of the impeller is located inside the funnel neck.

21. The device of claim 19, wherein the electrode stack comprises flow channels, and wherein the funnel supports the electrode stack within the battery housing, and wherein the funnel is configured to create a substantially even flow of electrolyte solution through the flow channels.

22. The device of claim 19, wherein the electrode stack comprises a plurality of anodes and a plurality of cathodes, and wherein the device further comprises a plurality of spaces disposed between adjacent anodes and cathodes of the plurality of anodes and the plurality of cathodes.

23. The device of claim 19, wherein the powering device comprises one or more exterior magnets, wherein the one or more exterior magnets are configured to magnetically couple through the housing to the one or more interior magnets.

24. A method for producing energy comprising:
- charging a flow-assisted battery to a charge voltage, wherein the flow-assisted battery comprises:
  - a battery housing, a cathode, an anode, and an electrolyte solution, wherein the anode and the cathode are arranged in an electrode stack, and wherein the cathode, the anode, and the electrolyte solution are supported within the battery housing;
- discharging the flow-assisted battery to a discharge voltage to produce energy;
- continuously circulating the electrolyte solution within the battery housing during the charging and the discharging by using a magnetic device for producing electrolyte flow in a flow-assisted battery;
- creating substantially even flow of the electrolyte solution through the one or more flow channels in the electrode stack using a funnel assembly during the circulation of the electrolyte solution.

25. The method of claim 24, wherein the magnetic device for producing electrolyte flow in a flow-assisted battery comprises;
- a powering device located outside of the battery housing, and
- an impeller assembly located within the battery housing, wherein the impeller assembly comprises a shaft, an impeller, and one or more interior magnets, and
- wherein the powering device and the impeller assembly are magnetically coupled through the battery housing.

26. The method of claim 24, wherein continuously circulating the electrolyte solution comprises rotating a component of the power device, wherein the component is magnetically coupled to the one or more interior magnets; rotating the interior magnets in response to rotating the component; rotating the shaft and impeller in response to rotating the interior magnets, and creating fluid flow based on the rotation of the impeller.

27. The method of claim 24, wherein the flow-assisted battery comprises an electrode stack, wherein the electrode stack comprises a plurality of flow channels, and wherein continuously circulating the electrolyte solution comprises substantially evenly circulating the electrolyte solution through the plurality of flow channels.

28. The method of claim 24, wherein the flow-assisted battery comprises a flow-assisted secondary nickel-zinc battery, wherein the anode comprises a zinc anode, and wherein the cathode comprises a nickel oxide cathode.

29. The method of claim 24, wherein the flow-assisted battery comprises a flow-assisted secondary zinc-manganese dioxide battery, wherein the anode comprises a zinc anode, and wherein the cathode comprises a manganese dioxide cathode.

* * * * *

UNITED STATES PATENT AND TRADEMARK OFFICE
CERTIFICATE OF CORRECTION

PATENT NO. : 9,728,767 B2  
APPLICATION NO. : 14/442246  
DATED : August 8, 2017  
INVENTOR(S) : Damon E. Turney and Kevin Galloway Page 1 of 1

It is certified that error appears in the above-identified patent and that said Letters Patent is hereby corrected as shown below:

In the Claims  
Column 32, Line 26: replace "of chum 1" with --of claim 1--.  
Column 32, Line 32: replace "wherein die interior" with --wherein the interior--.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*